US011639653B2

(12) United States Patent
Bolen et al.

(10) Patent No.: US 11,639,653 B2
(45) Date of Patent: May 2, 2023

(54) SYSTEMS AND METHODS FOR SIMULTANEOUSLY FRACTURING MULTIPLE WELLS FROM A COMMON WELLPAD

(71) Applicant: Chevron U.S.A. Inc., San Ramon, CA (US)

(72) Inventors: Matthew Scott Bolen, The Woodlands, TX (US); Andrew Thomas Ruhl, Houston, TX (US); Seung Jin Han, Katy, TX (US); Kristen Anne Belcourt, Houston, TX (US); Amos Sunghyun Kim, Houston, TX (US); Nicholas Andrew Zerante, Missouri City, TX (US); Ross Gerard Cazenave, Houston, TX (US); Jay Patrick Painter, League City, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/197,851

(22) Filed: Mar. 10, 2021

(65) Prior Publication Data

US 2022/0290543 A1 Sep. 15, 2022

(51) Int. Cl.
*E21B 43/26* (2006.01)
*F16L 41/03* (2006.01)

(52) U.S. Cl.
CPC .......... *E21B 43/2607* (2020.05); *E21B 43/26* (2013.01); *F16L 41/03* (2013.01)

(58) Field of Classification Search
CPC .... E21B 43/2607; E21B 43/26; E21B 43/267; F16L 41/03
See application file for complete search history.

(56) References Cited

U.S. PATENT DOCUMENTS

| | | | |
|---|---|---|---|
| 3,063,499 A | 11/1962 | Allen | |
| 2007/0125543 A1* | 6/2007 | McNeel | E21B 43/267 166/305.1 |
| 2014/0352968 A1 | 12/2014 | Pitcher et al. | |
| 2021/0156241 A1* | 5/2021 | Cook | F04B 53/16 |
| 2021/0262315 A1* | 8/2021 | Beason | F16N 11/00 |
| 2021/0310346 A1* | 10/2021 | Bull | E21B 43/2607 |
| 2021/0388931 A1* | 12/2021 | George | F16L 41/03 |

FOREIGN PATENT DOCUMENTS

WO  WO-2020205577 A1 *  10/2020  ........... E21B 33/068

* cited by examiner

*Primary Examiner* — James G Sayre
(74) *Attorney, Agent, or Firm* — Smith & Woldesenbet Law Group, PLLC

(57) ABSTRACT

A system for fracturing multiple wellbores on a multi-well pad can include a missile that receives high-pressure fracturing fluid from a plurality of pump truck. The system can also include a main manifold that receives the high-pressure fracturing fluid from the missile, where the main manifold includes multiple valves and multiple output channels, where each of the valves are operated between an open position and a closed position. The system can further include multiple wellbores including a first wellbore, a second wellbore, and a third wellbore, where the wellbores are connected to the output channels of the main manifold. The valves of the main manifold can be operated to enable simultaneous flow of the high-pressure fracturing fluid to the first wellbore, the second wellbore, and the third wellbore so that the first wellbore, the second wellbore, and the third wellbore are fractured simultaneously.

20 Claims, 16 Drawing Sheets

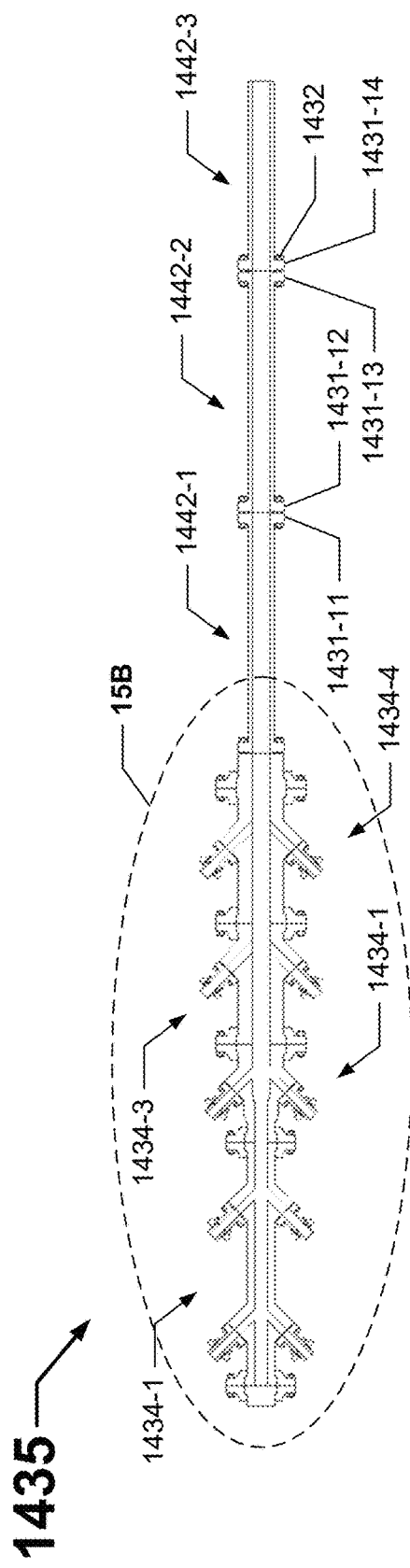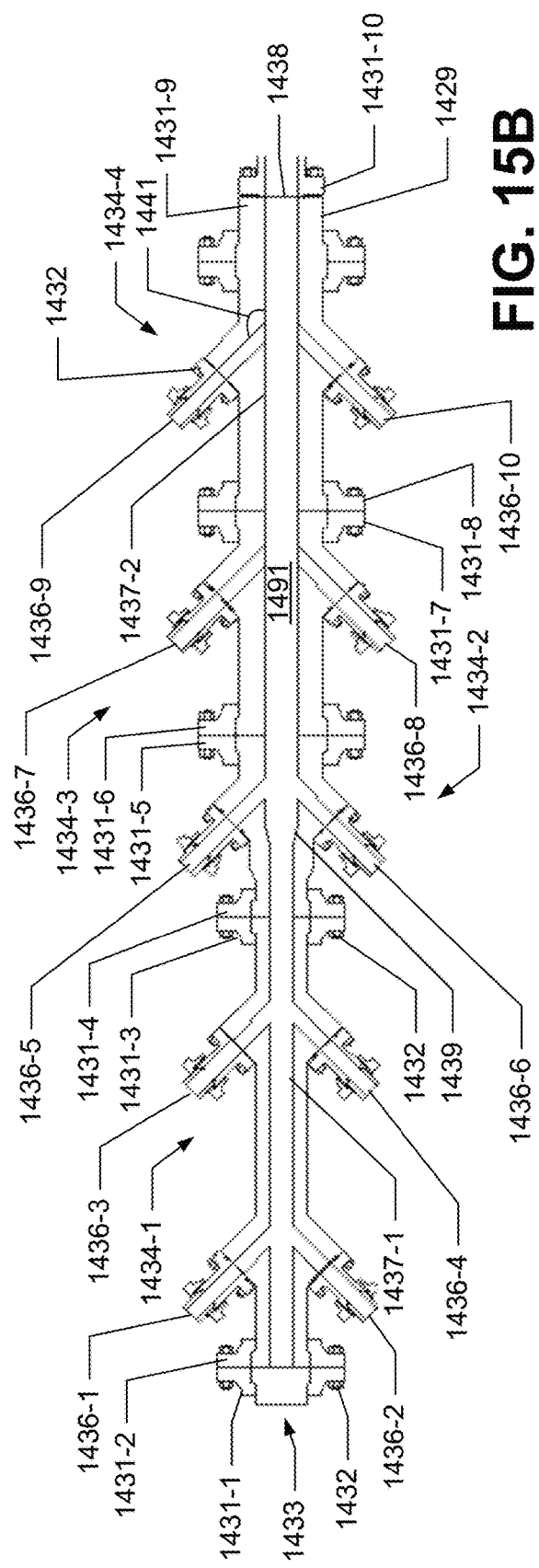

SYSTEMS AND METHODS FOR SIMULTANEOUSLY FRACTURING MULTIPLE WELLS FROM A COMMON WELLPAD

TECHNICAL FIELD

The present application is related to wellbore operations and, more particularly, to simultaneously fracturing multiple wells from a common wellpad (also referred to as a pad herein).

BACKGROUND

Hydraulic fracturing operations (often more simply called fracturing operations) are becoming more common in certain wellbores having horizontal sections. For example, when subterranean formations that have shale in which subterranean resources (e.g., oil, natural gas) are located, those subterranean resources are not extracted in significant quantities by simply drilling a wellbore in the shale. Instead, when the shale is fractured at multiple points within the wellbore, a significantly larger amount of the subterranean resources can be extracted.

Oftentimes, multiple wellbores, each with its own horizontal section, are drilled from the same location, often called a pad. A pad can span as much as several acres and leverages the proximity of the entry points of the wellbores to use the same field equipment for operations such as exploration, fracturing, and extraction. With multi-well pads, a common strategy is to strategically place the horizontal sections of the wellbores within the subterranean formation so that, when fracturing occurs, the extraction of the subterranean resource can be maximized.

Fracturing is an expensive and time-consuming process. As a result, efforts are made to streamline fracturing operations. A limitation that currently exists is that no more than 2 wells can be fractured simultaneously using the equipment from a single system. As a result, it may prove advantageous to create a system that can fracture three or more wells simultaneously.

SUMMARY

In general, in one aspect, the disclosure relates to a system for fracturing multiple wellbores on a multi-well pad. The system can include a missile that receives high-pressure fracturing fluid from a plurality of pump trucks. The system can also include a main manifold that receives the high-pressure fracturing fluid from the missile, where the main manifold comprises a plurality of valves and a plurality of output channels, where each of the plurality of valves are operated between an open position and a closed position. The system can further include a plurality of wellbores having a first wellbore, a second wellbore, and a third wellbore, where the plurality of wellbores is connected to the plurality of output channels of the main manifold. The plurality of valves of the main manifold can be operated to enable simultaneous flow of the high-pressure fracturing fluid to the first wellbore, the second wellbore, and the third wellbore so that the first wellbore, the second wellbore, and the third wellbore are fractured simultaneously using the high-pressure fracturing fluid.

In another aspect, the disclosure relates to a missile for a hydraulic fracturing system. The missile can include a high-pressure (HP) missile manifold having a plurality of HP input channels, a HP output channel, and a main HP channel disposed between the plurality of HP input channels and the HP output channel, where each of the plurality of HP input channels is configured to couple to and receive a fracturing fluid from pump truck, where the HP output channel is configured to couple to and send the fracturing fluid to a main manifold, and where the main HP channel has a widening section along its length that separates a first HP portion of the main HP channel having a first HP diameter and a second HP portion of the main HP channel having a second HP diameter.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 15A and 15B show an example of the low-pressure missile manifold of FIG. 14.

DESCRIPTION OF THE INVENTION

Figure 1:
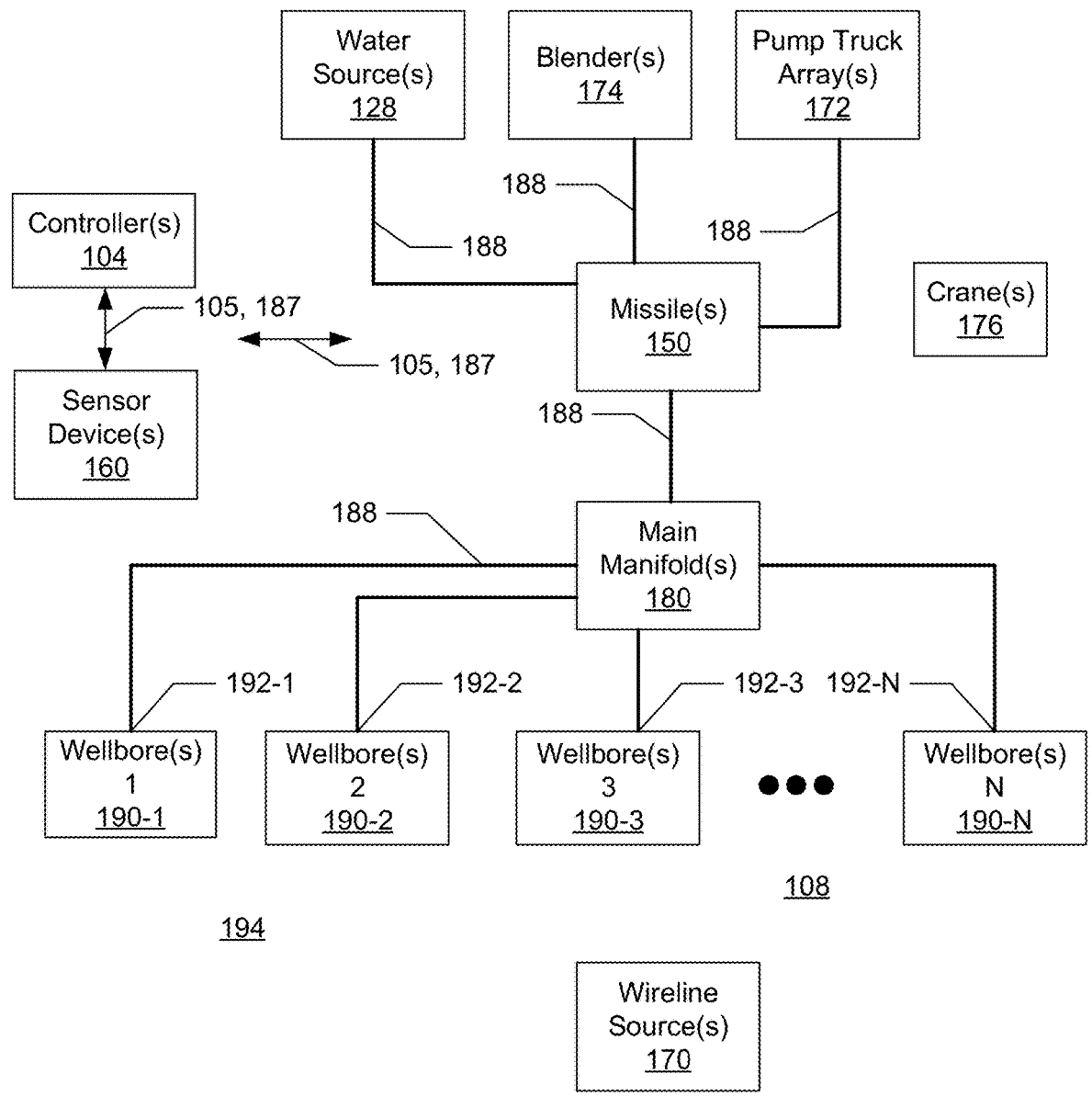
FIG. 1 shows a system for performing a simultaneous multi-well fracturing operation according to certain example embodiments.

The example embodiments discussed herein are directed to systems, methods, and devices for simultaneously fracturing multiple wells from a common pad. Wellbores that undergo fracturing operations for which example embodiments are used can be drilled and completed to extract a subterranean resource. Examples of a subterranean resource can include, but are not limited to, natural gas, oil, and water. Wellbores for which example embodiments are used for fracturing operations can be land-based or subsea. Example embodiments of systems used for simultaneously fracturing multiple wells from a common pad can be rated for use in hazardous environments.

An example system used for simultaneously fracturing multiple wells from a common pad includes multiple components that are described herein, where a component can be made from a single piece (as from a mold or an extrusion). When a component (or portion thereof) of an example system used for simultaneously fracturing multiple wells from a common pad is made from a single piece, the single piece can be cut out, bent, stamped, and/or otherwise shaped to create certain features, elements, or other portions of the component. Alternatively, a component (or portion thereof)

of an example system used for simultaneously fracturing multiple wells from a common pad can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example system used for simultaneously fracturing multiple wells from a common pad) can be made of one or more of a number of suitable materials, including but not limited to metal (e.g., stainless steel), ceramic, rubber, glass, and plastic.

A coupling feature (including a complementary coupling feature) as described herein can allow one or more components (e.g., a housing) and/or portions of an example system used for simultaneously fracturing multiple wells from a common pad to become mechanically coupled, directly or indirectly, to another portion of the system used for simultaneously fracturing multiple wells from a common pad and/or a component of a wellbore. A coupling feature can include, but is not limited to, a portion of a hinge, an aperture, a recessed area, a protrusion, a slot, a spring clip, a tab, a detent, and mating threads. One portion of an example system used for simultaneously fracturing multiple wells from a common pad can be coupled to another portion of the system used for simultaneously fracturing multiple wells from a common pad and/or a component of a wellbore by the direct use of one or more coupling features.

In addition, or in the alternative, a portion of an example system used for simultaneously fracturing multiple wells from a common pad can be coupled to another portion of the system used for simultaneously fracturing multiple wells from a common pad and/or a component of a wellbore using one or more independent devices that interact with one or more coupling features disposed on a component of the system used for simultaneously fracturing multiple wells from a common pad. Examples of such devices can include, but are not limited to, a pin, a hinge, a fastening device (e.g., a bolt, a screw, a rivet), an adapter, and a spring. One coupling feature described herein can be the same as, or different than, one or more other coupling features described herein. A complementary coupling feature as described herein can be a coupling feature that mechanically couples, directly or indirectly, with another coupling feature.

An example system used for simultaneously fracturing multiple wells from a common pad can be designed to comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA). Also, as discussed above, an example system used for simultaneously fracturing multiple wells from a common pad can be used in hazardous environments, and so example system used for simultaneously fracturing multiple wells from a common pad can be designed to comply with industry standards that apply to hazardous environments.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of systems used for simultaneously fracturing multiple wells from a common pad will be described more fully hereinafter with reference to the accompanying drawings, in which example embodiments of systems used for simultaneously fracturing multiple wells from a common pad are shown. Systems used for simultaneously fracturing multiple wells from a common pad may, however, be embodied in many different forms and should not be construed as limited to the example embodiments set forth herein. Rather, these example embodiments are provided so that this disclosure will be thorough and complete, and will fully convey the scope of systems used for simultaneously fracturing multiple wells from a common pad to those of ordinary skill in the art. Like, but not necessarily the same, elements (also sometimes called components) in the various figures are denoted by like reference numerals for consistency.

Terms such as "first", "second", "outer", "inner", "top", "bottom", "distal", "proximal", "on", and "within" are used merely to distinguish one component (or part of a component or state of a component) from another. This list of terms is not exclusive. Such terms are not meant to denote a preference or a particular orientation, and they are not meant to limit embodiments of systems used for simultaneously fracturing multiple wells from a common pad. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system 100 for performing a simultaneous multi-well fracturing operation according to certain example embodiments. The system 100 includes multiple components. In this case, the system 100 includes one or more water sources 128, one or more blenders 174, one or more pump trucks 172, one or more cranes 176, one or more missiles 150, one or more main manifolds 180, at least three wellbores 190 (e.g., wellbore 190-1, wellbore 190-2, wellbore 190-3, wellbore 190-N), one or more wireline sources 170, one or more sensor devices 160, and a controller 104.

The components shown in FIG. 1 are not exhaustive, and in some embodiments, one or more of the components shown in FIG. 1 may not be included in the example system 100. Any component of the system 100 can be discrete or combined with one or more other components of the system 100. Also, one or more components of the system 100 can have different configurations. For example, one or more sensor devices 160 can be disposed within or disposed on other components (e.g., the missile 150, the main manifold 180). As another example, the controller 104, rather than being a stand-alone device, can be part of another component (e.g., the missile 150) of the system 100. As yet another example, the system 100 can include one or more tanks and/or other fluid retention vessels, which are not shown in FIG. 1. As still another example, the system 100 can include sand trucks, hydration trucks, and trucks to add chemicals, all used to contribute ingredients to the fracturing fluid and none of which are shown in FIG. 1.

The system 100 can include one or more water sources 128. Each water source 128 is capable of providing any volume of water. A water source 128 can be a natural body of water, such as a bond, a lake, a river, or an ocean. Alternatively, a water source 128 can be a tank or other vessel that holds water. Each water source 128 can be connected to a missile 150 (or portion thereof) using piping 188. In a number of cases, the water stored in a water source 128 and delivered to the missile 150 through the piping 188 is at a low pressure relative to the pressure of the high-pressure fracturing fluid sent by the missile 150 to the main manifold 180. The water of a water source 128 can be naturally-occurring water (e.g., from a natural spring), chemically-treated water, brackish water, salt water (e.g., as from the ocean), or any other type of water.

The system 100 can include one or more blenders 174. Each of the blenders 174 is configured to mix two or more components (e.g., gel stabilizers, sand, corrosion inhibitors) of the fracturing fluid together. These components can be provided to a blender 174 by components of the system 100 not shown in FIG. 1. Such components can include, but are not limited to, trucks, pits, quarries, and Earth movers. A blender 174 can include one or more of a number of different pieces of equipment. Examples of such equipment can include, but are not limited to, a motor, a screw conveyer, a pump, a housing, a hopper, a tank, piping, a sensor device (e.g., sensor device 160), electrical cable, and a controller (e.g., controller 104). A blender 174 can be configured to blend any volume and/or number of components at any rate of flow or transfer. Multiple blenders 174 can work in conjunction with each other to blend multiple components of the fracturing fluid. One blender 174 can be dedicated to one missile 150 or can be used to feed multiple missiles 150. In some alternative embodiments, a blender 174 can be directly coupled to one or more pump trucks 172 rather than to a missile 150.

The system 100 can include one or more pump truck arrays 172. Each of the pump truck arrays 172 of the system 100 includes multiple pump trucks. A pump truck (also known by other names in the industry, including but not limited to a horsepower truck, a frac pump, and a fracturing pump) includes a group of equipment (e.g., pumps, motors, compressors, piping, valves, gauges) that receives water (e.g., directly or indirectly from one or more water sources 128) and other chemicals and other components (e.g., as blended by the blenders 174) at a relatively low pressure. The water, chemicals, and other components are mixed within the pump truck to result in fracturing fluid, and the pump truck pumps the fracturing fluid at a relatively high pressure to a missile 150 (or portion thereof).

This process of receiving water, chemicals, and other components, mixing those components, and pumping a resulting pressurized fracturing fluid by a pump truck of a pump truck array 172 can be continuous, at least for a period of time (e.g., an hour, 30 minutes). In some cases, this period of time is among a series of similar time periods that are separated from each other by another period of time (e.g., five minutes, 30 minutes) during which the pump truck is idle as other equipment (e.g., within a wellbore 190) is set up for another stage of a fracturing operation. The high-pressure fracturing fluid output by a pump truck can be delivered to a missile 150 through piping 188. The pumping equipment of a pump truck can be mounted on a truck, a trailer, or a skid. In any case, the pumping equipment of a pump truck can be configured to be moved from one location on or near the pad 194 to another. The pumping equipment of a pump truck can be rated, for example, between 1,000 HP and 3,000 HP to pressurize the fracturing fluid to an appropriate level.

The system 100 can include one or more cranes 176. Each of the cranes 176 of the system 100 is equipment or a collection of equipment that is used to physically move one or more other components (e.g., a blender 174, a missile 150) from one location on or near the pad 194. A crane 176 can have one or more of any of a number of configurations. For example, a crane 176 can be mounted on the back of a truck, have a telescopic reach, and have a maximum reach of 50 feet, in a configuration commonly called a cherry picker. As another example, a crane 176 can be mounted on a fixed platform and have a fixed reach of 300 feet. In any case, a crane 176 is configured to safely lift, move, and place other components (e.g., a pump truck of a pump truck array 172, a missile 150) of the system 100 on or near the pad 194.

The system 100 can include one or more missiles 150. In some cases, as detailed by way of example in FIGS. 14 through 16 below, a missile 150 can include multiple components that are used for multiple stages in preparing and outputting high-pressure fracturing fluid. Each missile 150 is a special type of manifold that receives the high-pressure fracturing fluid from the output of each pump truck of one or more of the pump truck arrays 172 and subsequently sends the high-pressure fracturing fluid to one or more of the main manifolds 180. In the current art, a missile is configured to handle less than 120-140 bpm, which is only sufficient to effectively fracture no more than two wellbores 190 simultaneously. For example, in the current art, performing a fracturing operation on two wellbores simultaneously results in a flow of approximately 60 bpm to each wellbore. However, when performing a fracturing operation on more than 2 wellbores simultaneously using a missile in the current art, the flow rate falls below 60 bpm to each wellbore, making the fracturing operation in all of the multiple wellbores ineffective.

By contrast, a missile 150 used in the example system 100 is configured to output a flow rate of the high-pressure fracturing fluid at a rate of least 160-180 bpm. As a result, when fracturing three or more wellbores 190 simultaneously using a missile 150 in the example system 100, the flow exiting the manifold 180 to each of the three or more wellbores 190 can be approximately 60 bpm (or some other flow rate sufficient to effectively perform the fracturing operations in all of the three or more wellbores 190).

In order to handle the higher pressures and flow rates of the fracturing fluid, an example missile 150 (or portion thereof) can include one or more features (e.g., a narrowing section, a widening section). Details of changing the diameter of a channel running through a missile 150 are discussed in more detail below with respect to FIGS. 14 through 16. A missile 150 (or portion thereof) can include multiple components that include piping (similar to the piping 188) and valves. In certain example embodiments, a missile 150 also includes one or more sensor devices 160. Examples of such sensor devices 160 can include, but are not limited to, a flow meter, a pressure meter, and a temperature gauge. In addition, or in the alternative, a missile 150 can be controlled, in whole or in part, by a controller 104. In such a case, the controller 104 can be part of the missile 150 or can be located remotely from the missile 150.

The system 100 can include one or more main manifolds 180. Each main manifold 180 receives the high-pressure fracturing fluid from one or more missiles 150 and sends the high-pressure fracturing fluid to multiple wellbores 190 simultaneously. A main manifold 180 can include multiple components that include piping and valves. By operating (e.g., fully opening, fully closing) one or more of the valves of the main manifold 180, the flow of the high-pressure fracturing fluid can be directed to particular wellbores 190 at a given point in time. A main manifold 180 can be configured so that its valves can be operated while the high-pressure fracturing fluid continues to flow. In this way, the other components (e.g., the pump truck arrays 172, the missile 150) of the system 100 can continue to operate without stopping while starting a fracturing operation at one wellbore 190 (e.g., wellbore 190-3) and/or ending a fracturing operation at another wellbore 190 (e.g., wellbore 190-1). A detailed example of a main manifold 180 is shown below with respect to FIGS. 12 and 13.

The system 100 can include three or more wellbores 190 (in this case, wellbore 190-1, wellbore 190-2, wellbore 190-3, and wellbore 190-N). Each wellbore 190 is located on a pad 194 and is disposed in a subterranean formation. Each wellbore 190 is defined by a wall after being drilled using field equipment (e.g., a derrick, a tool pusher, a clamp, a tong, drill pipe, casing pipe, a drill bit, and a fluid pumping system). Once the wellbore 190 (or a section thereof) is drilled, a casing string is inserted into the wellbore 190 and subsequently cemented to the wellbore 190 to stabilize the wellbore 190 and allow for the extraction of subterranean resources (e.g., oil, natural gas) from the subterranean formation.

The surface 108 can be ground level for an on-shore (also called land-based) application (as in this case) and the sea floor for an off-shore application. The point where the wellbore 190 begins at the surface 108 can be called the entry point 192. As shown in FIG. 1, there can be multiple wellbores 190, each with their own entry point 192 on the same pad 194. In this case, entry point 192-1 defines the start of the wellbore 190-1, entry point 192-2 defines the start of the wellbore 190-2, entry point 192-3 defines the start of the wellbore 190-3, and entry point 192-N defines the start of the wellbore 190-N.

The subterranean formation can include one or more of a number of formation types, including but not limited to shale, limestone, sandstone, clay, sand, and salt. A subterranean formation can include one or more reservoirs in which one or more resources (e.g., oil, gas, water, steam) can be located. One or more of a number of field operations (e.g., fracking, coring, tripping, drilling, setting casing, extracting downhole resources) can be performed to reach an objective of a user with respect to the subterranean formation.

Each wellbore 190 can have one or more of a number of segments, where each segment can have one or more of a number of dimensions. Examples of such dimensions can include, but are not limited to, size (e.g., diameter) of a wellbore 190, a curvature of a wellbore 190, a total vertical depth of a wellbore 190, a measured depth of a wellbore 190, and a horizontal displacement of a wellbore 190. A wellbore 190 can also undergo multiple cementing operations, where each cementing operation covers part or all of a segment of the wellbore 190 or multiple segments of the wellbore 190.

The system 100 can include one or more wireline sources 170. Each wireline source 170 includes wireline cabling equipment, which is used to acquire subsurface petrophysical and geophysical data and the delivery of well construction services such as pipe recovery, perforating, plug setting and well cleaning and fishing. The well logging facilities of a wireline source 170 can record and/or process data associated with seismic equipment, sonic equipment, and ultrasonic equipment. In fracturing operations, a wireline source 170 can be used to record/process data and/or deliver well services such as perforating and plug setting.

The high-pressure fracturing fluid (or portions or components thereof) can be transferred from one component of the system 100 to another component of the system 100 using piping 188. The piping 188 can include multiple pipes, elbows, joints, and similar components that are coupled to each other (e.g., using coupling features such as mating threads) to establish a network for transferring fluids. Each component of the piping 188 can have an appropriate size (e.g., inner diameter, outer diameter) and be made of an appropriate material (e.g., stainless steel) to safely handle the pressure and the flow rate of the high-pressure fracturing fluid.

The system 100 can include one or more controllers 104. A controller 104 of the system 100 communicates with and in some cases controls one or more of the other components (e.g., a sensor device 160, a missile 150, a main manifold 180) of the system 100. The controller 104 performs a number of functions that include receiving data, evaluating data, following protocols, running algorithms, and sending commands. The controller 104 can include one or more of a number of components. Such components of the controller 104 can include, but are not limited to, a control engine, a communication module, a timer, a counter, a power module, a storage repository, a hardware processor, memory, a transceiver, an application interface, and a security module. When there are multiple controllers 104, each controller 104 can operate independently of each other. Alternatively, one or more of the controllers 104 can work cooperatively with each other. As yet another alternative, one of the controllers 104 can control some or all of one or more other controllers 104 in the system 100.

Each sensor device 160 includes one or more sensors that measure one or more parameters (e.g., pressure, flow rate, temperature, magnetic field, proximity). A sensor device 160 can be integrated with or measure a parameter associated with one or more components of the system 100. For example, a sensor device 160 can be configured to measure a parameter (e.g., flow rate, pressure, temperature) of a fluid flowing through the piping 188 at a particular location (e.g., between the missile 150 and the main manifold 180). As another example, a sensor device 160 can be configured to determine how open or closed a valve of a main manifold 180 is. A sensor device 160 can have one or multiple sensors. In some cases, a number of sensors and/or sensor devices 160, each measuring a different parameter, can be used in combination to determine and confirm whether a controller 104 should take a particular action (e.g., operate a valve, control a pump motor).

Interaction between each controller 104, the sensor devices 160, and other components (e.g., a blender 174, a pump truck array 172, a missile 150, a main manifold 180) of the system 100 can be conducted using communication links 105 and/or power transfer links 187. Each communication link 105 can include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, WirelessHART, ISA100) technology. A communication link 105 can transmit signals (e.g., communication signals, control signals, data) between each controller 104, the sensor devices 160, and other components of the system 100.

Each power transfer link 187 can include one or more electrical conductors, which can be individual or part of one or more electrical cables. In some cases, as with inductive power, power can be transferred wirelessly using power transfer links 187. A power transfer link 187 can transmit power between each controller 104, the sensor devices 160, and other components of the system 100. Each power transfer link 187 can be sized (e.g., 12 gauge, 18 gauge, 4 gauge) in a manner suitable for the amount (e.g., 480V, 24V, 120V) and type (e.g., alternating current, direct current) of power transferred therethrough.

Figure 2:
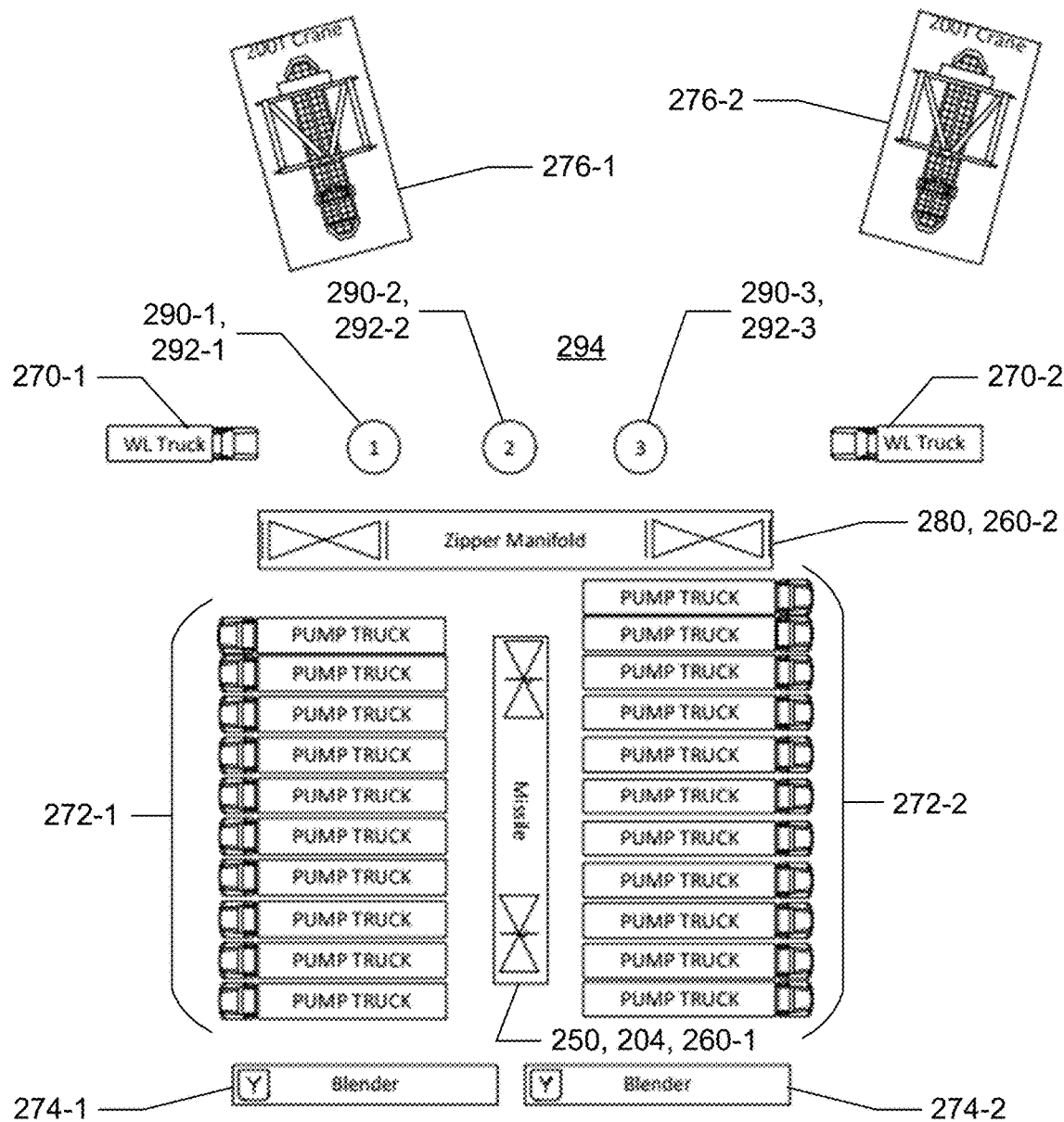
FIGS. 2 through 11 show various system configurations for performing multi-well fracturing operations according to certain example embodiments.
Figure 3:
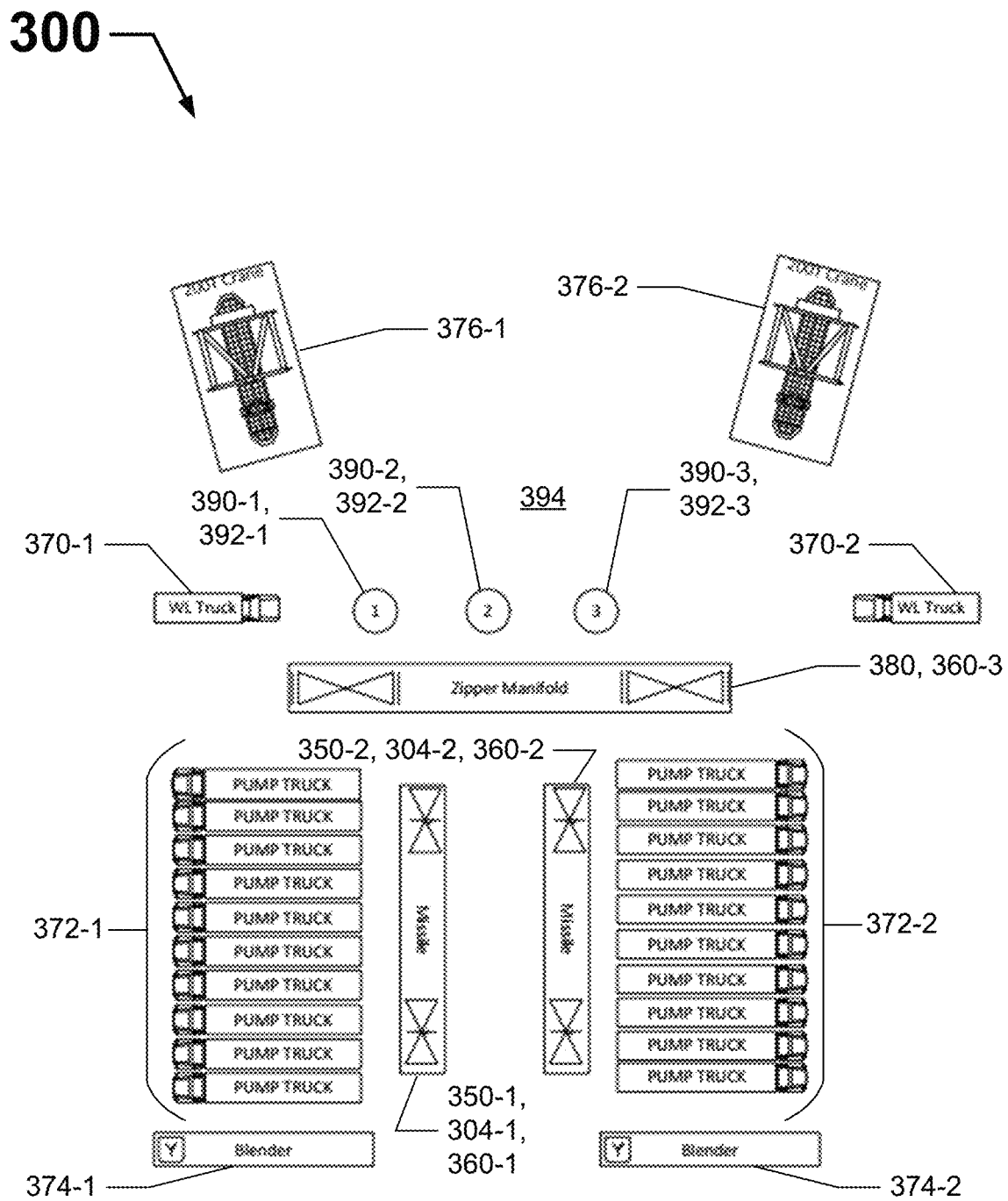
Figure 4:
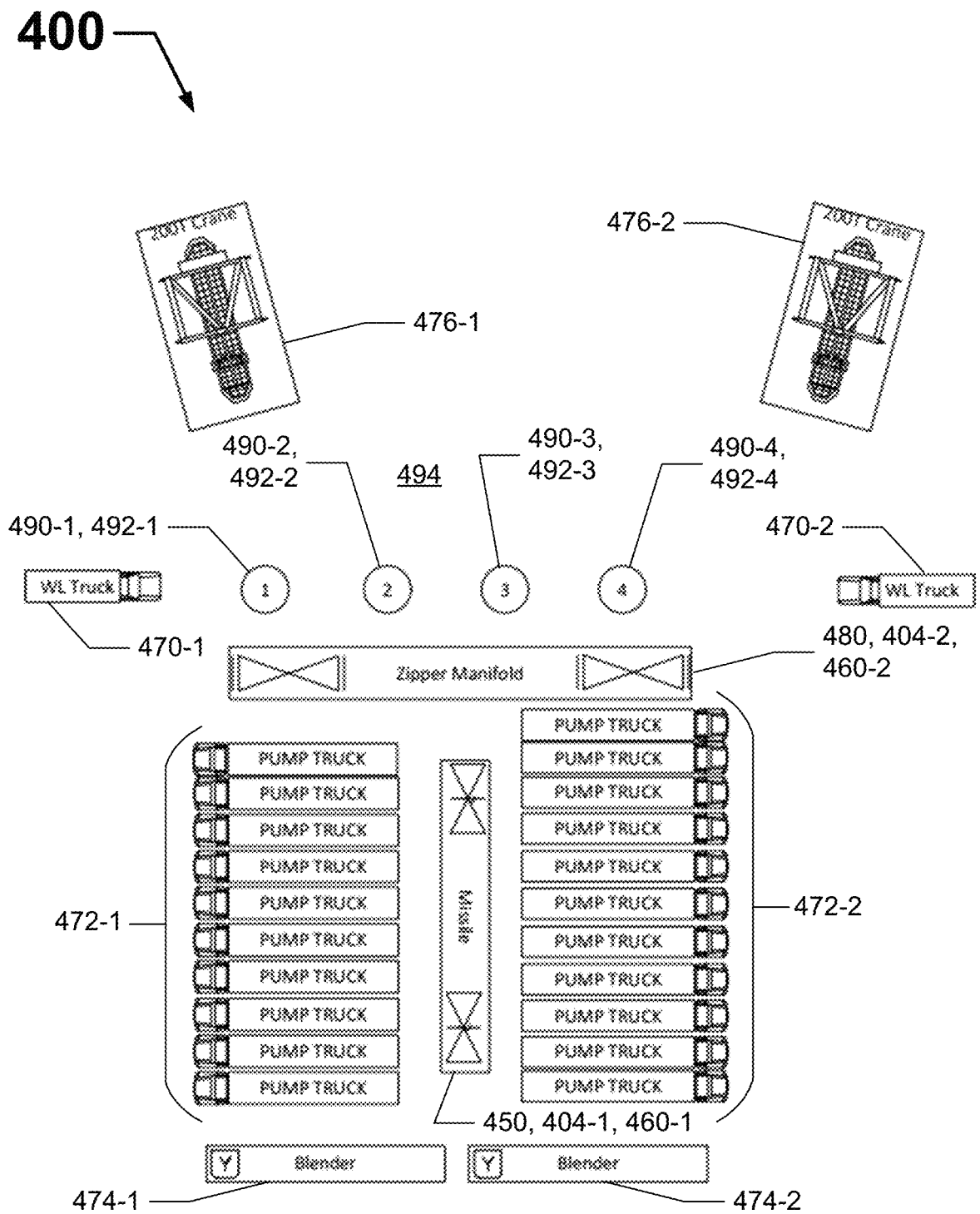
Figure 5:
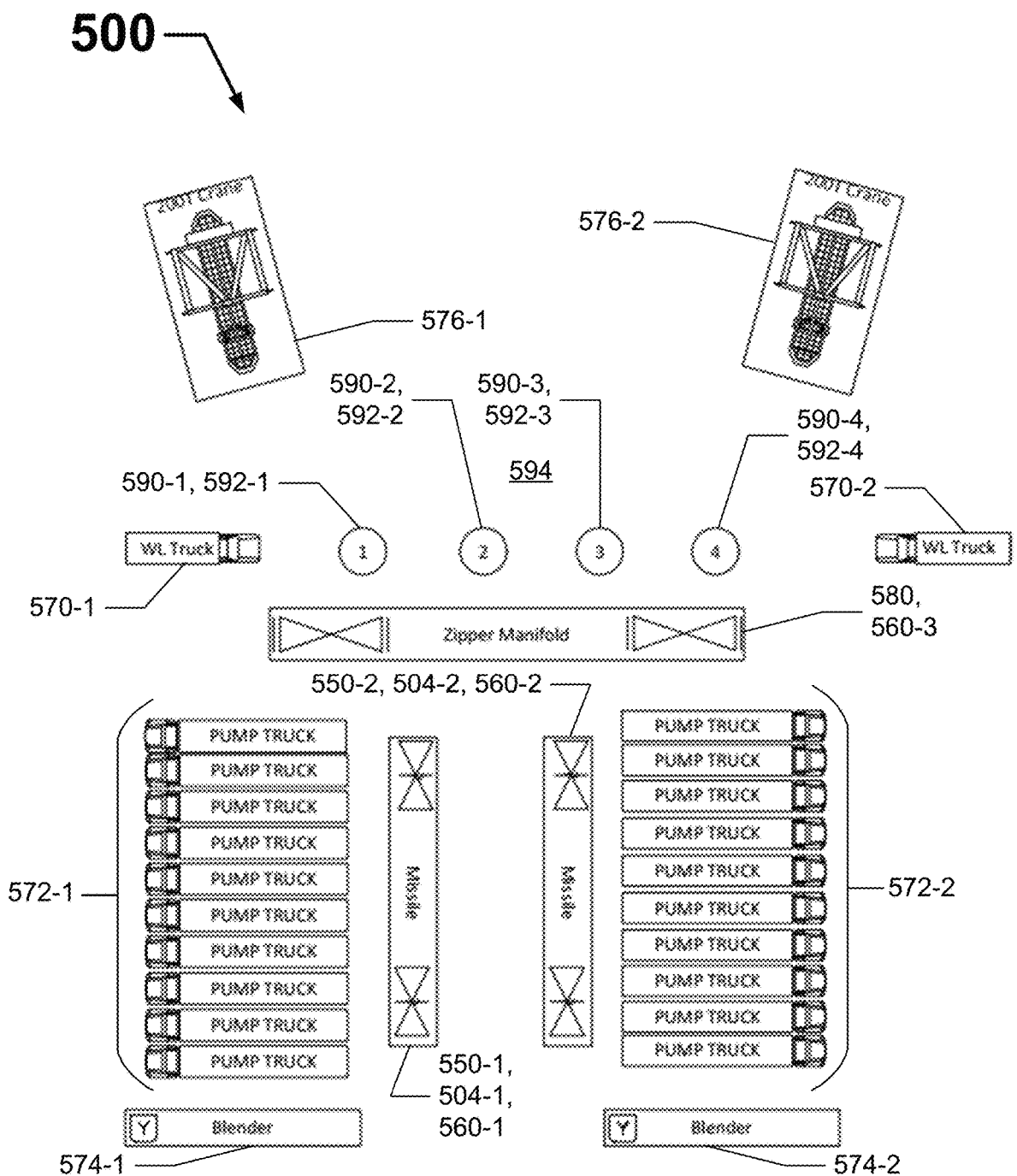
Figure 6:
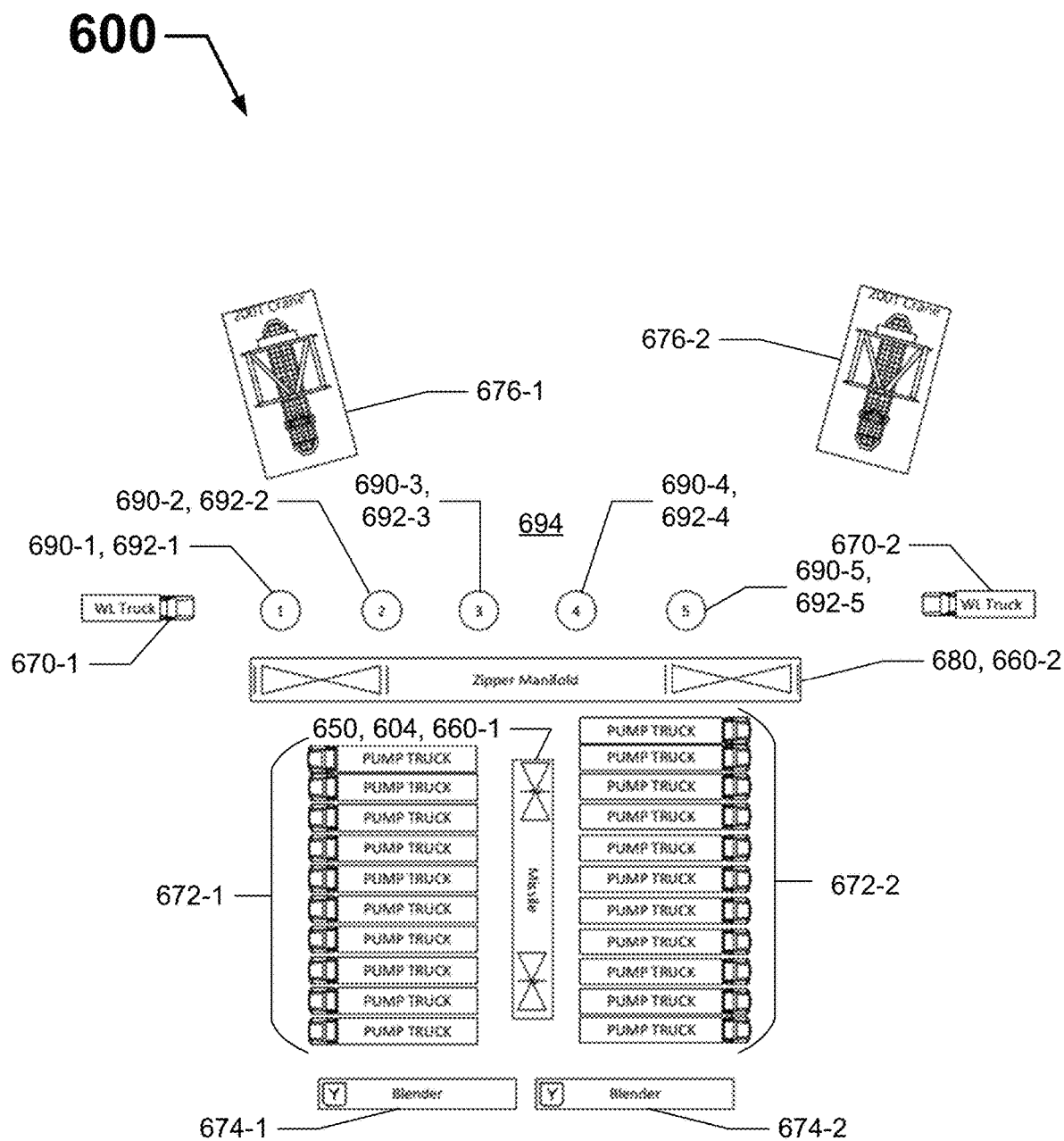
Figure 7:
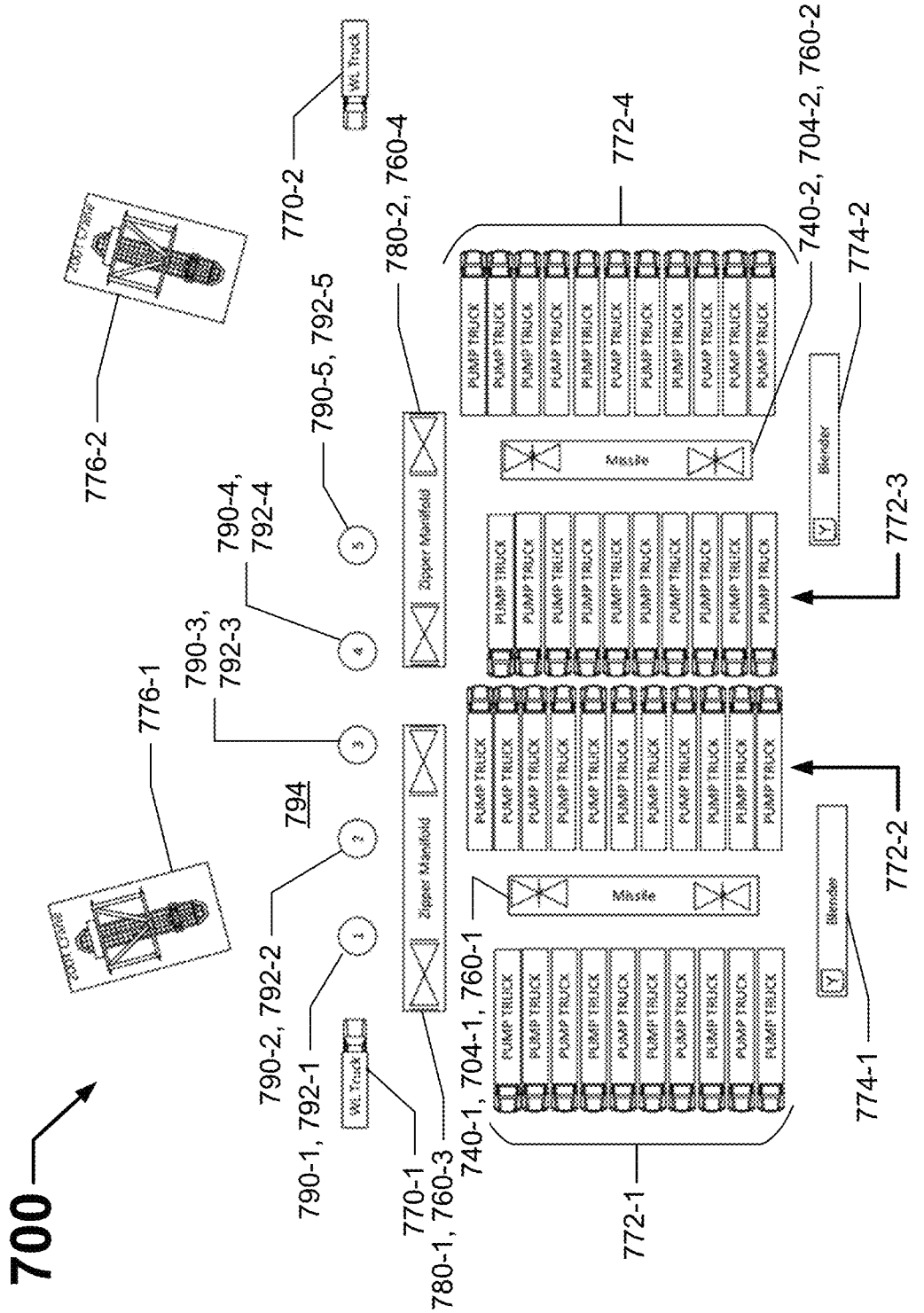
Figure 8:
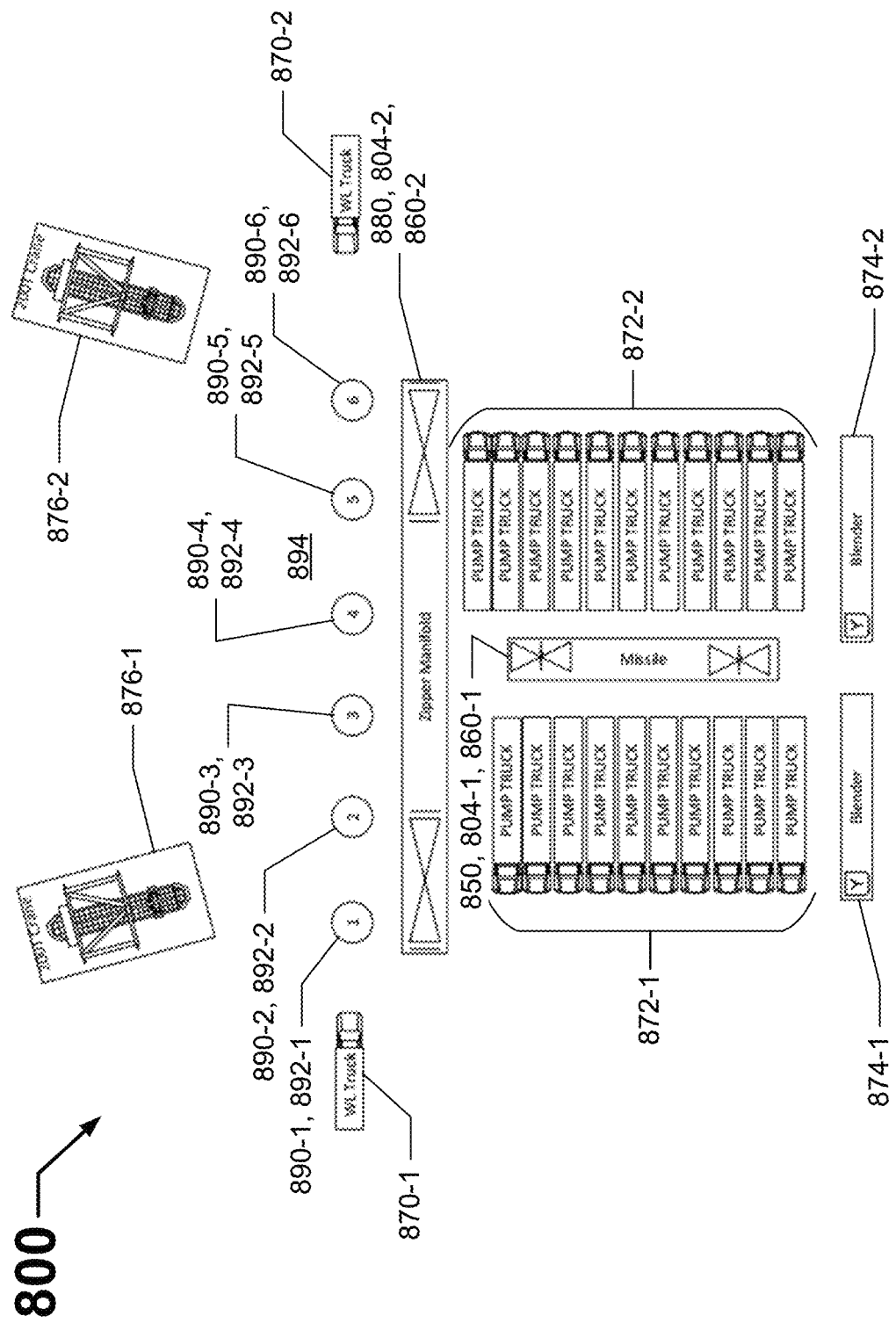
Figure 9:
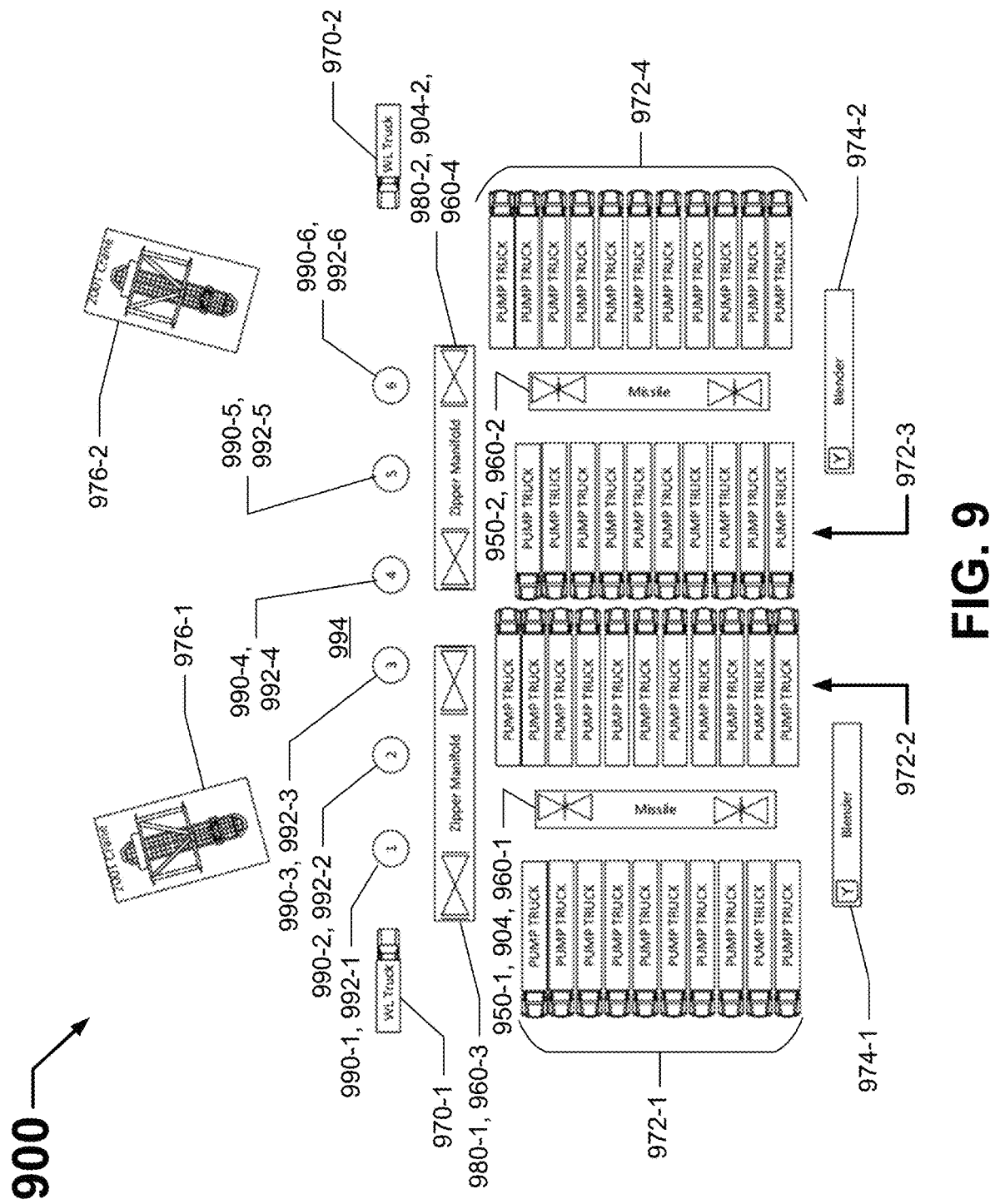
Figure 10:
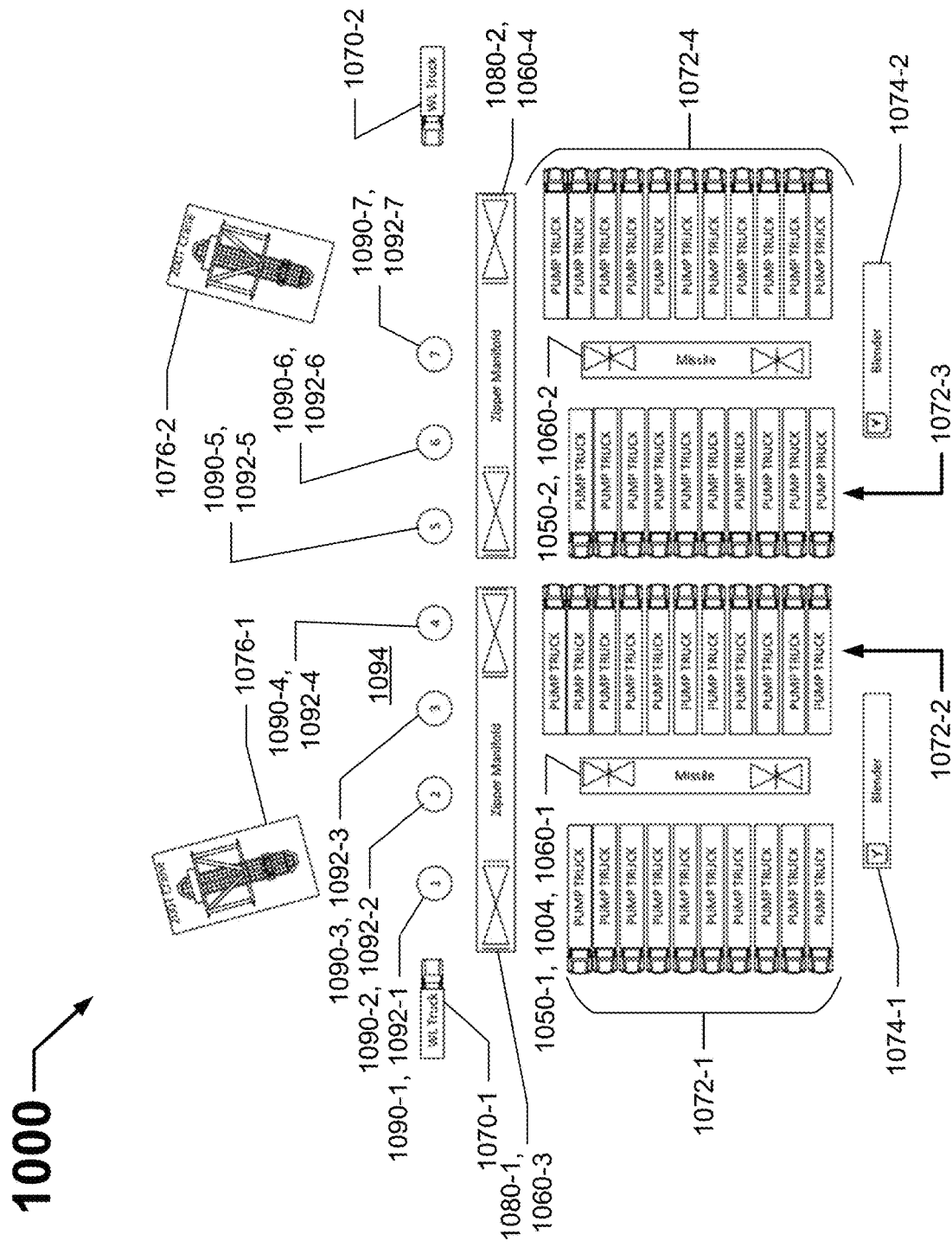
Figure 11:
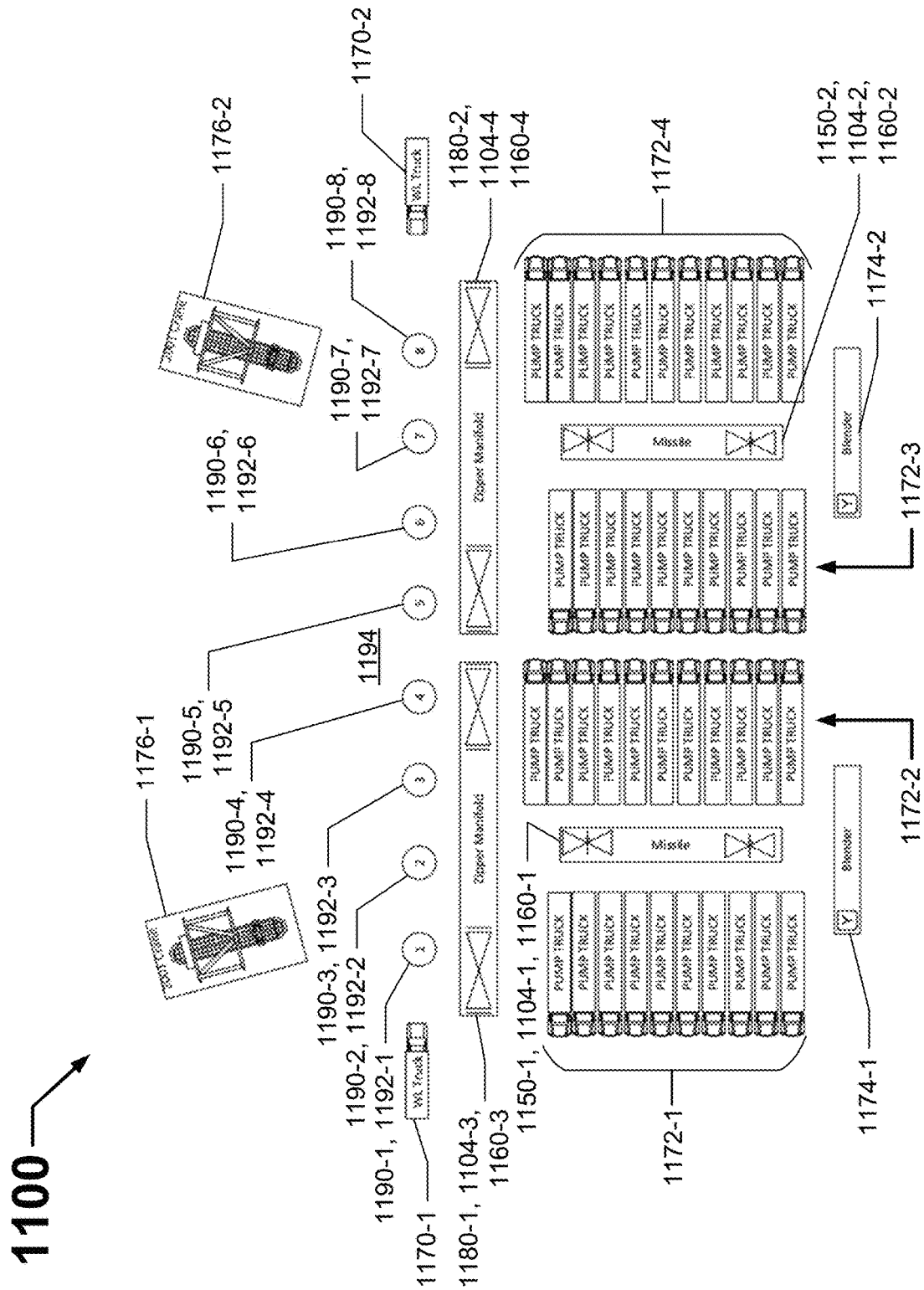

FIGS. 2 through 11 show various system configurations for performing multi-well fracturing operations according to certain example embodiments. Specifically, FIG. 2 shows a system 200 used to perform multi-well fracturing operations. FIG. 3 shows another system 300 used to perform multi-well fracturing operations. FIG. 4 shows yet another system 400 used to perform multi-well fracturing operations. FIG. 5 shows still another system 500 used to perform multi-well fracturing operations. FIG. 6 shows yet another system 600 used to perform multi-well fracturing operations. FIG. 7 shows still another system 700 used to perform multi-well fracturing operations. FIG. 8 shows yet another system 800 used to perform multi-well fracturing operations. FIG. 9 shows still another system 900 used to perform multi-well fracturing operations. FIG. 10 shows yet another system 1000 used to perform multi-well fracturing operations. FIG. 11 shows still another system 1100 used to perform multi-well fracturing operations.

Referring to FIGS. 1 through 11, the wireline sources, the main manifolds, the missiles, the cranes, the blenders, the pump trucks, the wellbores, the controllers, and the sensor devices of FIGS. 2 through 11 can be substantially the same as the wireline sources 170, the main manifolds 180, the missiles 150, the cranes 176, the blenders 174, the pump truck arrays 172, the wellbores 190, the controller 104, and the sensor devices 160 of FIG. 1. FIGS. 2 through 11 do not show piping (e.g., piping 188), communication links (e.g., communication links 105), water sources (e.g., water source 128), and power transfer links (e.g., power transfer links 187) to simplify the drawings even though those components are present in each of the respective systems.

The system 200 of FIG. 2 includes two cranes 276 (crane 276-1 and crane 276-2), two wireline sources 270 (wireline source 270-1 and wireline source 270-2), three wellbores 290 (wellbore 290-1, wellbore 290-2, and wellbore 290-3), one main manifold 280, one missile 250, two arrays of pump trucks 272 (pump truck array 272-1 and pump truck array 272-2), and two blenders 274 (blender 274-1 and blender 274-2). Wellbore 290-1 has an entry point 292-1, wellbore 290-2 has an entry point 292-2, and wellbore 290-3 has an entry point 292-3. The three entry points 292 are located at a common pad 294. Pump truck array 272-1 has 10 pump trucks, and pump truck array 272-2 has 11 pump trucks.

The system 200 of FIG. 2 also includes a controller 204 and at least two sensor devices 260 (sensor device 260-1 and sensor device 260-2). In this case, the controller 204 is integrated with the missile 250. The sensor device 260-1 is integrated with the missile 250, and the sensor device 260-2 is integrated with the main manifold 280. The sensor device 260-1 and the sensor device 260-2 can each measure parameters including, but not limited to, pressure, temperature, and flow rate.

The missile 250 of the system 200 of FIG. 2 is configured to provide fracturing fluid to the main manifold 280 at a flow rate of at least 180 bpm. Also, the main manifold 280 is configured to provide the fracturing fluid received from the missile 250 to the entry point 292-1 of the wellbore 290-1, to the entry point 292-2 of the wellbore 290-2, and to the entry point 292-3 of the wellbore 290-3 simultaneously so that wellbore 290-1, the wellbore 290-2, and the wellbore 290-3 can undergo a fracturing operation simultaneously. The controller 204 can control valves, motors, and/or other equipment associated with the missile 250. In addition, the controller 204 can control valves, motors, and/or other equipment associated with other components (e.g., the main manifold 280) of the system 200.

The system 300 of FIG. 3 includes two cranes 376 (crane 376-1 and crane 376-2), two wireline sources 370 (wireline source 370-1 and wireline source 370-2), three wellbores 390 (wellbore 390-1, wellbore 390-2, and wellbore 390-3), one main manifold 380, two missiles 350 (missile 350-1 and missile 350-2), two arrays of pump trucks 372 (pump truck array 372-1 and pump truck array 372-2), and two blenders 374 (blender 374-1 and blender 374-2). Wellbore 390-1 has an entry point 392-1, wellbore 390-2 has an entry point 392-2, and wellbore 390-3 has an entry point 392-3. The three entry points 392 are located at a common pad 394. Pump truck array 372-1 has 10 pump trucks, and pump truck array 372-2 also has 10 pump trucks.

The system 300 of FIG. 3 also includes two controllers 304 (controller 304-1 and controller 304-2) and at least three sensor devices 360 (sensor device 360-1, sensor device 360-2, and sensor device 360-3). In this case, the controller 304-1 is integrated with the missile 350-1, and the controller 304-2 is integrated with the missile 350-2. The sensor device 360-1 is integrated with the missile 350-1, and the sensor device 360-2 is integrated with the missile 350-2. Also, the sensor device 360-3 is integrated with the main manifold 380. The sensor device 360-1, the sensor device 360-2, and the sensor device 360-3 can each measure parameters including, but not limited to, pressure, temperature, and flow rate.

The missile 350-1 and the missile 350-2 of the system 300 of FIG. 3 are configured to provide fracturing fluid to the main manifold 380 at a flow rate of at least 180 bpm. Also, the main manifold 380 is configured to provide the fracturing fluid received from the missile 350-1 and the missile 350-2 to the entry point 392-1 of the wellbore 390-1, to the entry point 392-2 of the wellbore 390-2, and to the entry point 392-3 of the wellbore 390-3 simultaneously so that the wellbore 390-1, the wellbore 390-2, and the wellbore 390-3 can undergo a fracturing operation simultaneously. The controller 304-1 and the controller 304-2 can each control valves, motors, and/or other equipment associated with the missile 350-1 and the missile 350-2, respectively. In addition, the controller 304-1 and/or the controller 304-2 can control valves, motors, and/or other equipment associated with other components (e.g., the blenders 374) of the system 300. The controller 304-1 and the controller 304-2 can operate independently of each other. Alternatively, the controller 304-1 and the controller 304-2 can work cooperatively with each other. As yet another alternative, one of the controllers 304 (e.g., controller 304-1) can control some or all of the other controller 304 (e.g., controller 304-2).

The system 400 of FIG. 4 includes two cranes 476 (crane 476-1 and crane 476-2), two wireline sources 470 (wireline source 470-1 and wireline source 470-2), four wellbores 490 (wellbore 490-1, wellbore 490-2, wellbore 490-3, and wellbore 490-4), one main manifold 480, one missile 450, two arrays of pump trucks 472 (pump truck array 472-1 and pump truck array 472-2), and two blenders 474 (blender 474-1 and blender 474-2). Wellbore 490-1 has an entry point 492-1, wellbore 490-2 has an entry point 492-2, wellbore 490-3 has an entry point 492-3, and wellbore 490-4 has an entry point 492-4. The four entry points 492 are located at a common pad 494. Pump truck array 472-1 has 10 pump trucks, and pump truck array 472-2 has 11 pump trucks.

The system 400 of FIG. 4 also includes two controllers 404 (controller 404-1 and controller 404-2) and at least two sensor devices 460 (sensor device 460-1 and sensor device 460-2). In this case, the controller 404-1 is integrated with the missile 450, and the controller 404-2 is integrated with the main manifold 480. The sensor device 460-1 is integrated with the missile 450, and the sensor device 460-2 is integrated with the main manifold 480. The sensor device 460-1 and the sensor device 460-2 can each measure parameters including, but not limited to, pressure, temperature, and flow rate.

The missile 450 of the system 400 of FIG. 4 is configured to provide fracturing fluid to the main manifold 480 at a flow rate of at least 180 bpm. Also, the main manifold 480 is configured to provide the fracturing fluid received from the missile 450 to at least three of the entry point 492-1 of the wellbore 490-1, to the entry point 492-2 of the wellbore 490-2, to the entry point 492-3 of the wellbore 490-3, and to the entry point 492-4 of the wellbore 490-4 simultaneously so that at least three of the wellbore 490-1, the wellbore 490-2, the wellbore 490-3, and the wellbore 490-4 can undergo a fracturing operation simultaneously. The controller 404-1 and the controller 404-2 can each control valves, motors, and/or other equipment associated with the missile 450 and the main manifold 480, respectively. In addition, the controller 404-1 and/or the controller 404-2 can control valves, motors, and/or other equipment associated with other components (e.g., the blenders 474) of the system 400. The controller 404-1 and the controller 404-2 can operate independently of each other. Alternatively, the controller 404-1 and the controller 404-2 can work cooperatively with each other. As yet another alternative, one of the controllers 404 (e.g., controller 404-1) can control some or all of the other controller 404 (e.g., controller 404-2).

The system 500 of FIG. 5 includes two cranes 576 (crane 576-1 and crane 576-2), two wireline sources 570 (wireline source 570-1 and wireline source 570-2), four wellbores 590 (wellbore 590-1, wellbore 590-2, wellbore 590-3, and wellbore 590-4), one main manifold 580, two missiles 550 (missile 550-1 and missile 550-2), two arrays of pump trucks 572 (pump truck array 572-1 and pump truck array 572-2), and two blenders 574 (blender 574-1 and blender 574-2). Wellbore 590-1 has an entry point 592-1, wellbore 590-2 has an entry point 592-2, wellbore 590-3 has an entry point 592-3, and wellbore 590-4 has an entry point 592-4. The four entry points 592 are located at a common pad 594. Pump truck array 572-1 has 10 pump trucks, and pump truck array 572-2 also has 10 pump trucks.

The system 500 of FIG. 5 also includes two controllers 504 (controller 504-1 and controller 504-2) and at least three sensor devices 560 (sensor device 560-1, sensor device 560-2, and sensor device 560-3). In this case, the controller 504-1 is integrated with the missile 550-1, and the controller 504-2 is integrated with the missile 550-2. The sensor device 560-1 is integrated with the missile 550-1, and the sensor device 560-2 is integrated with the missile 550-2. Also, the sensor device 560-3 is integrated with the main manifold 580. The sensor device 560-1, the sensor device 560-2, and the sensor device 560-3 can each measure parameters including, but not limited to, pressure, temperature, and flow rate.

The missile 550-1 and the missile 550-2 of the system 500 of FIG. 5 are configured to provide fracturing fluid to the main manifold 580 at a flow rate of at least 180 bpm. Also, the main manifold 580 is configured to provide the fracturing fluid received from the missile 550-1 and the missile 550-2 to at least three of the entry point 592-1 of the wellbore 590-1, to the entry point 592-2 of the wellbore 590-2, to the entry point 592-3 of the wellbore 590-3, and to the entry point 592-4 of the wellbore 590-4 simultaneously so that at least three of the wellbore 590-1, the wellbore 590-2, the wellbore 590-3, and the wellbore 590-4 can undergo a fracturing operation simultaneously. The controller 504-1 and the controller 504-2 can each control valves, motors, and/or other equipment associated with the missile 550-1 and the missile 550-2, respectively. In addition, the controller 504-1 and/or the controller 504-2 can control valves, motors, and/or other equipment associated with other components (e.g., the blenders 574) of the system 500. The controller 504-1 and the controller 504-2 can operate independently of each other. Alternatively, the controller 504-1 and the controller 504-2 can work cooperatively with each other. As yet another alternative, one of the controllers 504 (e.g., controller 504-1) can control some or all of the other controller 504 (e.g., controller 504-2).

The system 600 of FIG. 6 includes two cranes 676 (crane 676-1 and crane 676-2), two wireline sources 670 (wireline source 670-1 and wireline source 670-2), five wellbores 690 (wellbore 690-1, wellbore 690-2, wellbore 690-3, wellbore 690-4, and wellbore 690-5), one main manifold 680, one missile 650, two arrays of pump trucks 672 (pump truck array 672-1 and pump truck array 672-2), and two blenders 674 (blender 674-1 and blender 674-2). Wellbore 690-1 has an entry point 692-1, wellbore 690-2 has an entry point 692-2, wellbore 690-3 has an entry point 692-3, wellbore 690-4 has an entry point 692-4, and wellbore 690-5 has an entry point 692-5. The five entry points 692 are located at a common pad 694. Pump truck array 672-1 has 10 pump trucks, and pump truck array 672-2 has 11 pump trucks.

The system 600 of FIG. 6 also includes one controller 604 and at least two sensor devices 660 (sensor device 660-1 and sensor device 660-2). In this case, the controller 604 is integrated with the missile 650. The sensor device 660-1 is integrated with the missile 650, and the sensor device 660-2 is integrated with the main manifold 680. The sensor device 660-1 and the sensor device 660-2 can each measure parameters including, but not limited to, pressure, temperature, and flow rate.

The missile 650 of the system 600 of FIG. 6 is configured to provide fracturing fluid to the main manifold 680 at a flow rate of at least 180 bpm. Also, the main manifold 680 is configured to provide the fracturing fluid received from the missile 650 to at least three of the entry point 692-1 of the wellbore 690-1, to the entry point 692-2 of the wellbore 690-2, to the entry point 692-3 of the wellbore 690-3, to the entry point 692-4 of the wellbore 690, and to the entry point 692-5 of the wellbore 690-5 simultaneously so that at least three of the wellbore 690-1, the wellbore 690-2, the wellbore 690-3, the wellbore 690-4, and the wellbore 690-5 can undergo a fracturing operation simultaneously. The controller 604 can control valves, motors, and/or other equipment associated with the missile 650. In addition, the controller 604 can control valves, motors, and/or other equipment associated with other components (e.g., the main manifold 680, the blenders 674) of the system 600.

The system 700 of FIG. 7 includes two cranes 776 (crane 776-1 and crane 776-2), two wireline sources 770 (wireline source 770-1 and wireline source 770-2), five wellbores 790 (wellbore 790-1, wellbore 790-2, wellbore 790-3, wellbore 790-4, and wellbore 790-5), two main manifolds 780 (main manifold 780-1 and main manifold 780-2), two missiles 750 (missile 750-1 and missile 750-2), four arrays of pump trucks 772 (pump truck array 772-1, pump truck array 772-2, pump truck array 772-3, and pump truck array 772-4), and two blenders 774 (blender 774-1 and blender 774-2). Wellbore 790-1 has an entry point 792-1, wellbore 790-2 has an entry point 792-2, wellbore 790-3 has an entry point 792-3, wellbore 790-4 has an entry point 792-4, and wellbore 790-5 has an entry point 792-5. The five entry points 792 are located at a common pad 794. Pump truck array 772-1 and pump truck array 772-3 each has 10 pump trucks, and pump truck array 772-2 and pump truck array 772-4 each has 11 pump trucks.

The system 700 of FIG. 7 also includes two controllers 704 (controller 704-1 and controller 704-2) and at least four sensor devices 760 (sensor device 760-1, sensor device 760-2, sensor device 760-3, and sensor device 760-4). In this case, the controller 704-1 is integrated with the missile 750-1, and the controller 704-2 is integrated with the missile 750-2. The sensor device 760-1 is integrated with the missile 750-1, and the sensor device 760-2 is integrated with the missile 750-2. Also, the sensor device 760-3 is integrated with the main manifold 780-1, and the sensor device 760-4 is integrated with the main manifold 780-2. The sensor device 760-1, the sensor device 760-2, the sensor device 760-3, and the sensor device 760-4 can each measure parameters including, but not limited to, pressure, temperature, and flow rate.

The missile 750-1 and the missile 750-2 of the system 700 of FIG. 7 are configured to provide fracturing fluid to the main manifold 780-1 and the main manifold 780-2, respectively, at a flow rate of at least 180 bpm. Also, the main manifold 780-1 is configured to provide the fracturing fluid received from the missile 750-1 to at least three of the entry point 792-1 of the wellbore 790-1, to the entry point 792-2 of the wellbore 790-2, to the entry point 792-3 of the wellbore 790-3, to the entry point 792-4 of the wellbore 790-4, and to the entry point 792-5 of the wellbore 790-5 simultaneously so that at least three of the wellbore 790-1, the wellbore 790-2, the wellbore 790-3, the wellbore 790-4, and the wellbore 790-5 can undergo a fracturing operation simultaneously. Further, the main manifold 780-2 is configured to provide the fracturing fluid received from the missile 750-2 to at least two of the entry point 792-1 of the wellbore 790-1, to the entry point 792-2 of the wellbore 790-2, to the entry point 792-3 of the wellbore 790-3, to the entry point 792-4 of the wellbore 790-4, and to the entry point 792-5 of the wellbore 790-5 simultaneously so that at least two of the wellbore 790-1, the wellbore 790-2, the wellbore 790-3, the wellbore 790-4, and the wellbore 790-5 can undergo a fracturing operation simultaneously.

The controller 704-1 and the controller 704-2 can each control valves, motors, and/or other equipment associated with the missile 750-1 and the missile 750-2, respectively. In addition, the controller 704-1 and/or the controller 704-2 can control valves, motors, and/or other equipment associated with other components (e.g., the blenders 774) of the system 700. The controller 704-1 and the controller 704-2 can operate independently of each other. Alternatively, the controller 704-1 and the controller 704-2 can work cooperatively with each other. As yet another alternative, one of the controllers 704 (e.g., controller 704-1) can control some or all of the other controller 704 (e.g., controller 704-2).

The system 800 of FIG. 8 includes two cranes 876 (crane 876-1 and crane 876-2), two wireline sources 870 (wireline source 870-1 and wireline source 870-2), six wellbores 890 (wellbore 890-1, wellbore 890-2, wellbore 890-3, wellbore 890-4, wellbore 890-5, and wellbore 890-6), one main manifold 880, one missile 850, two arrays of pump trucks 872 (pump truck array 872-1 and pump truck array 872-2), and two blenders 874 (blender 874-1 and blender 874-2). Wellbore 890-1 has an entry point 892-1, wellbore 890-2 has an entry point 892-2, wellbore 890-3 has an entry point 892-3, wellbore 890-4 has an entry point 892-4, wellbore 890-5 has an entry point 892-5, and wellbore 890-6 has an entry point 892-6. The six entry points 892 are located at a common pad 894. Pump truck array 872-1 has 10 pump trucks, and pump truck array 872-2 has 11 pump trucks.

The system 800 of FIG. 8 also includes two controllers 804 (controller 804-1 and controller 804-2) and at least two sensor devices 860 (sensor device 860-1 and sensor device 860-2). In this case, the controller 804-1 is integrated with the missile 850, and the controller 804-2 is integrated with the main manifold 880. The sensor device 860-1 is integrated with the missile 850, and the sensor device 860-2 is integrated with the main manifold 880. The sensor device 860-1 and the sensor device 860-2 can each measure parameters including, but not limited to, pressure, temperature, and flow rate.

The missile 850 of the system 800 of FIG. 8 is configured to provide fracturing fluid to the main manifold 880 at a flow rate of at least 180 bpm. Also, the main manifold 880 is configured to provide the fracturing fluid received from the missile 850 to at least three of the entry point 892-1 of the wellbore 890-1, to the entry point 892-2 of the wellbore 890-2, to the entry point 892-3 of the wellbore 890-3, to the entry point 892-4 of the wellbore 890-4, to the entry point 892-5 of the wellbore 890-5, and to the entry point 892-6 of the wellbore 890-6 simultaneously so that at least three of the wellbore 890-1, the wellbore 890-2, the wellbore 890-3, the wellbore 890-4, the wellbore 890-5, and the wellbore 890-6 can undergo a fracturing operation simultaneously. The controller 804-1 and the controller 804-2 can each control valves, motors, and/or other equipment associated with the missile 850 and the main manifold 880, respectively. In addition, the controller 804-1 and/or the controller 804-2 can control valves, motors, and/or other equipment associated with other components (e.g., the blenders 874) of the system 800. The controller 804-1 and the controller 804-2 can operate independently of each other. Alternatively, the controller 804-1 and the controller 804-2 can work cooperatively with each other. As yet another alternative, one of the controllers 804 (e.g., controller 804-1) can control some or all of the other controller 804 (e.g., controller 804-2).

The system 900 of FIG. 9 includes two cranes 976 (crane 976-1 and crane 976-2), two wireline sources 970 (wireline source 970-1 and wireline source 970-2), six wellbores 990 (wellbore 990-1, wellbore 990-2, wellbore 990-3, wellbore 990-4, wellbore 990-5, and wellbore 990-6), two main manifolds 980 (main manifold 980-1 and main manifold 980-2), two missiles 950 (missile 950-1 and missile 950-2), four arrays of pump trucks 972 (pump truck array 972-1, pump truck array 972-2, pump truck array 972-3, and pump truck array 972-4), and two blenders 974 (blender 974-1 and blender 974-2). Wellbore 990-1 has an entry point 992-1, wellbore 990-2 has an entry point 992-2, wellbore 990-3 has an entry point 992-3, wellbore 990-4 has an entry point 992-4, wellbore 990-5 has an entry point 992-5, and wellbore 990-6 has an entry point 992-6. The six entry points 992 are located at a common pad 994. Pump truck array 972-1 and pump truck array 972-3 each has 10 pump trucks, and pump truck array 972-2 and pump truck array 972-4 each has 11 pump trucks.

The system 900 of FIG. 9 also includes two controllers 904 (controller 904-1 and controller 904-2) and at least four sensor devices 960 (sensor device 960-1, sensor device 960-2, sensor device 960-3, and sensor device 960-4). In this case, the controller 904-1 is integrated with the missile 950-1, and the controller 904-2 is integrated with the main manifold 980-2. The sensor device 960-1 is integrated with the missile 950-1, and the sensor device 960-2 is integrated with the missile 950-2. Also, the sensor device 960-3 is integrated with the main manifold 980-1, and the sensor device 960-4 is integrated with the main manifold 980-2. The sensor device 960-1, the sensor device 960-2, the sensor device 960-3, and the sensor device 960-4 can each measure parameters including, but not limited to, pressure, temperature, and flow rate.

The missile 950-1 and the missile 950-2 of the system 900 of FIG. 9 are configured to provide fracturing fluid to the main manifold 980-1 and the main manifold 980-2, respectively, at a flow rate of at least 180 bpm. Also, the main manifold 980-1 is configured to provide the fracturing fluid received from the missile 950-1 to at least three of the entry point 992-1 of the wellbore 990-1, to the entry point 992-2 of the wellbore 990-2, to the entry point 992-3 of the wellbore 990-3, to the entry point 992-4 of the wellbore 990-4, to the entry point 992-5 of the wellbore 990-5, and to the entry point 992-6 of the wellbore 990-6 simultaneously so that at least three of the wellbore 990-1, the wellbore 990-2, the wellbore 990-3, the wellbore 990-4, the wellbore 990-5, and the wellbore 990-6 can undergo a fracturing operation simultaneously. Further, the main manifold 980-2 is configured to provide the fracturing fluid received from the missile 950-2 to at least two of the entry point 992-1 of the wellbore 990-1, to the entry point 992-2 of the wellbore 990-2, to the entry point 992-3 of the wellbore 990-3, to the entry point 992-4 of the wellbore 990-4, to the entry point 992-5 of the wellbore 990-5, and to the entry point 992-6 of the wellbore 990-6 simultaneously so that at least two of the wellbore 990-1, the wellbore 990-2, the wellbore 990-3, the wellbore 990-4, the wellbore 990-5, and the wellbore 990-6 can undergo a fracturing operation simultaneously.

The controller 904-1 and the controller 904-2 can each control valves, motors, and/or other equipment associated with the missile 950-1 and the missile 950-2, respectively. In addition, the controller 904-1 and/or the controller 904-2 can control valves, motors, and/or other equipment associated with other components (e.g., the missile 950-2, the blenders 974) of the system 900. The controller 904-1 and the controller 904-2 can operate independently of each other. Alternatively, the controller 904-1 and the controller 904-2 can work cooperatively with each other. As yet another alternative, one of the controllers 904 (e.g., controller 904-1) can control some or all of the other controller 904 (e.g., controller 904-2).

The system 1000 of FIG. 10 includes two cranes 1076 (crane 1076-1 and crane 1076-2), two wireline sources 1070 (wireline source 1070-1 and wireline source 1070-2), seven wellbores 1090 (wellbore 1090-1, wellbore 1090-2, wellbore 1090-3, wellbore 1090-4, wellbore 1090-5, wellbore 1090-6, and wellbore 1090-7), two main manifolds 1080 (main manifold 1080-1 and main manifold 1080-2), two missiles 1050 (missile 1050-1 and missile 1050-2), four arrays of pump trucks 1072 (pump truck array 1072-1, pump truck array 1072-2, pump truck array 1072-3, and pump truck array 1072-4), and two blenders 1074 (blender 1074-1 and blender 1074-2). Wellbore 1090-1 has an entry point 1092-1, wellbore 1090-2 has an entry point 1092-2, wellbore 1090-3 has an entry point 1092-3, wellbore 1090-4 has an entry point 1092-4, wellbore 1090-5 has an entry point 1092-5, wellbore 1090-6 has an entry point 1092-6, and wellbore 1090-7 has an entry point 1092-7. The six entry points 1092 are located at a common pad 1094. Pump truck array 1072-1 and pump truck array 1072-3 each has 10 pump trucks, and pump truck array 1072-2 and pump truck array 1072-4 each has 11 pump trucks.

The system 1000 of FIG. 10 also includes two controllers 1004 (controller 1004-1 and controller 1004-2) and at least four sensor devices 1060 (sensor device 1060-1, sensor device 1060-2, sensor device 1060-3, and sensor device 1060-4). In this case, the controller 1004-1 is integrated with the missile 1050-1, and the controller 1004-2 is integrated with the main manifold 1080-2. The sensor device 1060-1 is integrated with the missile 1050-1, and the sensor device 1060-2 is integrated with the missile 1050-2. Also, the sensor device 1060-3 is integrated with the main manifold 1080-1, and the sensor device 1060-4 is integrated with the main manifold 1080-2. The sensor device 1060-1, the sensor device 1060-2, the sensor device 1060-3, and the sensor device 1060-4 can each measure parameters including, but not limited to, pressure, temperature, and flow rate.

The missile 1050-1 and the missile 1050-2 of the system 1000 of FIG. 10 are configured to provide fracturing fluid to the main manifold 1080-1 and the main manifold 1080-2, respectively, at a flow rate of at least 180 bpm. Also, the main manifold 1080-1 is configured to provide the fracturing fluid received from the missile 1050-1 to at least three of the entry point 1092-1 of the wellbore 1090-1, to the entry point 1092-2 of the wellbore 1090-2, to the entry point 1092-3 of the wellbore 1090-3, to the entry point 1092-4 of the wellbore 1090-4, to the entry point 1092-5 of the wellbore 1090-5, to the entry point 1092-6 of the wellbore 1090-6, and to the entry point 1092-7 of the wellbore 1090-7 simultaneously so that at least three of the wellbore 1090-1, the wellbore 1090-2, the wellbore 1090-3, the wellbore 1090-4, the wellbore 1090-5, the wellbore 1090-6, and the wellbore 1090-7 can undergo a fracturing operation simultaneously.

Further, the main manifold 1080-2 is configured to provide the fracturing fluid received from the missile 1050-2 to at least two of the entry point 1092-1 of the wellbore 1090-1, to the entry point 1092-2 of the wellbore 1090-2, to the entry point 1092-3 of the wellbore 1090-3, to the entry point 1092-4 of the wellbore 1090-4, to the entry point 1092-5 of the wellbore 1090-5, to the entry point 1092-6 of the wellbore 1090-6, and to the entry point 1092-7 of the wellbore 1090-7 simultaneously so that at least two of the wellbore 1090-1, the wellbore 1090-2, the wellbore 1090-3, the wellbore 1090-4, the wellbore 1090-5, the wellbore 1090-6, and the wellbore 1090-7 can undergo a fracturing operation simultaneously. The controller 1004 can each control valves, motors, and/or other equipment associated with the missile 1050-1. In addition, the controller 1004 can control valves, motors, and/or other equipment associated with other components (e.g., the missile 1050-2, the main manifold 1080-2) of the system 1000.

The system 1100 of FIG. 11 includes two cranes 1176 (crane 1176-1 and crane 1176-2), two wireline sources 1170 (wireline source 1170-1 and wireline source 1170-2), eight wellbores 1190 (wellbore 1190-1, wellbore 1190-2, wellbore 1190-3, wellbore 1190-4, wellbore 1190-5, wellbore 1190-6, wellbore 1190-7, and wellbore 1190-8), two main manifolds 1180 (main manifold 1180-1 and main manifold 1180-2), two missiles 1150 (missile 1150-1 and missile 1150-2), four arrays of pump trucks 1172 (pump truck array 1172-1, pump truck array 1172-2, pump truck array 1172-3, and pump truck array 1172-4), and two blenders 1174 (blender 1174-1 and blender 1174-2). Wellbore 1190-1 has an entry point 1192-1, wellbore 1190-2 has an entry point 1192-2, wellbore 1190-3 has an entry point 1192-3, wellbore 1190-4 has an entry point 1192-4, wellbore 1190-5 has an entry point 1192-5, wellbore 1190-6 has an entry point 1192-6, wellbore 1190-7 has an entry point 1192-7, and wellbore 1190-8 has an entry point 1192-8. The six entry points 1192 are located at a common pad 1194. Pump truck array 1172-1 and pump truck array 1172-3 each has 10 pump trucks, and pump truck array 1172-2 and pump truck array 1172-4 each has 11 pump trucks.

The system 1100 of FIG. 11 also includes two controllers 1104 (controller 1104-1 and controller 1104-2) and at least four sensor devices 1160 (sensor device 1160-1, sensor device 1160-2, sensor device 1160-3, and sensor device 1160-4). In this case, the controller 1104-1 is integrated with the missile 1150-1, and the controller 1104-2 is integrated with the main manifold 1180-2. The sensor device 1160-1 is integrated with the missile 1150-1, and the sensor device 1160-2 is integrated with the missile 1150-2. Also, the sensor device 1160-3 is integrated with the main manifold 1180-1, and the sensor device 1160-4 is integrated with the main manifold 1180-2. The sensor device 1160-1, the sensor device 1160-2, the sensor device 1160-3, and the sensor device 1160-4 can each measure parameters including, but not limited to, pressure, temperature, and flow rate.

The missile 1150-1 and the missile 1150-2 of the system 1100 of FIG. 11 are configured to provide fracturing fluid to the main manifold 1180-1 and the main manifold 1180-2, respectively, at a flow rate of at least 180 bpm. Also, the main manifold 1180-1 is configured to provide the fracturing fluid received from the missile 1150-1 to at least three of the entry point 1192-1 of the wellbore 1190-1, to the entry point 1192-2 of the wellbore 1190-2, to the entry point 1192-3 of the wellbore 1190-3, to the entry point 1192-4 of the wellbore 1190-4, to the entry point 1192-5 of the wellbore 1190-5, to the entry point 1192-6 of the wellbore 1190-6, to the entry point 1192-7 of the wellbore 1190-7, and to the entry point 1192-8 of the wellbore 1190-8 simultaneously so that at least three of the wellbore 1190-1, the wellbore 1190-2, the wellbore 1190-3, the wellbore 1190-4, the wellbore 1190-5, the wellbore 1190-6, the wellbore 1190-7, and the wellbore 1190-8 can undergo a fracturing operation simultaneously.

Further, the main manifold 1180-2 is configured to provide the fracturing fluid received from the missile 1150-2 to at least two of the entry point 1192-1 of the wellbore 1190-1, to the entry point 1192-2 of the wellbore 1190-2, to the entry point 1192-3 of the wellbore 1190-3, to the entry point 1192-4 of the wellbore 1190-4, to the entry point 1192-5 of the wellbore 1190-5, to the entry point 1192-7 of the wellbore 1190-7, and to the entry point 1192-8 of the wellbore 1190-8 simultaneously so that at least two of the wellbore 1190-1, the wellbore 1190-2, the wellbore 1190-3, the wellbore 1190-4, the wellbore 1190-5, the wellbore 1190-6, the wellbore 1190-7, and the wellbore 1190-8 can undergo a fracturing operation simultaneously.

The controller 1104-1, the controller 1104-2, the controller 1104-3, the controller 1104-4 can each control valves, motors, and/or other equipment associated with the missile 1150-1, the missile 1150-2, the main manifold 1180-1, and the main manifold 1180-2, respectively. In addition, the controller 1104-1, the controller 1104-2, the controller 1104-3, and/or the controller 1104-4 can control valves, motors, and/or other equipment associated with other components (e.g., the the blenders 1074) of the system 1000. The controller 1104-1, the controller 1104-2, the controller 1104-3, and/or the controller 1104-4 can operate independently of each other. Alternatively, the controller 1104-1, the controller 1104-2, the controller 1104-3, and/or the controller 1104-4 can work cooperatively with each other. As yet another alternative, one of the controllers 1104 (e.g., controller 1104-1) can control some or all of one or more of the other controllers 1104 (e.g., controller 1104-4).

Figure 12:
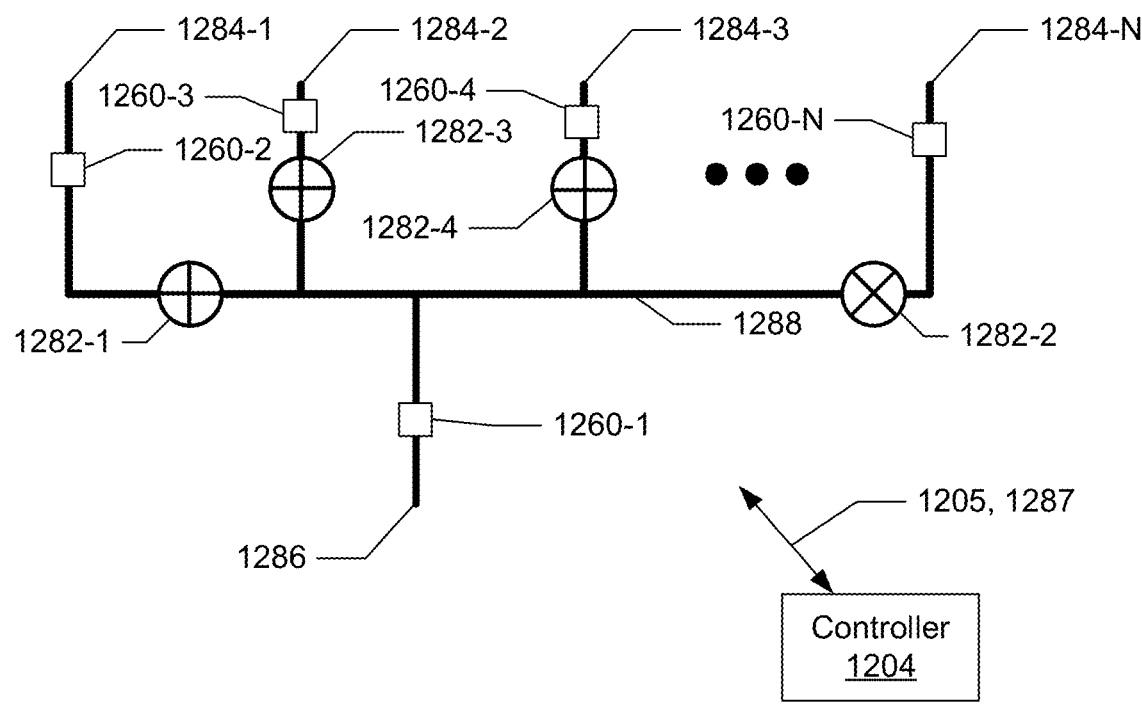
FIGS. 12 and 13 show a main manifold according to certain example embodiments.
Figure 13:
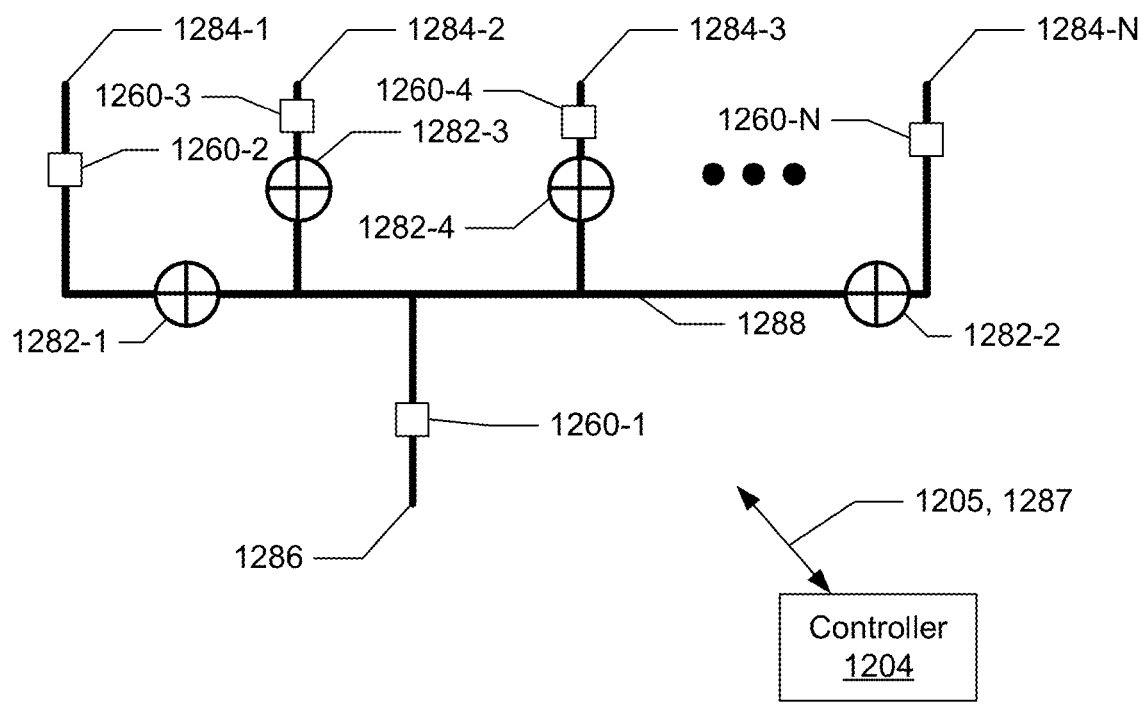

FIGS. 12 and 13 show a main manifold 1280 according to certain example embodiments. Specifically, FIG. 12 shows the main manifold 1280 at a first time, and FIG. 13 shows the main manifold 1280 at a second time. Referring to FIGS. 1 through 13, the main manifold 1280 of FIGS. 12 and 13 can be substantially the same as the main manifolds discussed above. In this case, the main manifold 1280 has one input 1286, N outputs 1284 (e.g., output 1284-1, output 1284-2, output 1284-3, output 1284-N), at least four valves 1282 (valve 1282-1, 1282-2, valve 1282-3, and valve 1282-4), and N sensor devices 1260 (e.g., sensor device 1260-1, sensor device 1260-2, sensor device 1260-3, sensor device 1260-N) that are all connected to each other by piping 1288. The main manifold 1280 can also include a controller 1204.

FIGS. 12 and 13 show a main manifold 1280 according to certain example embodiments. Referring to FIGS. 1 through 13, the main manifold 1280 can be substantially the same as the main manifolds discussed above. The main manifold 1280 has one input channel 1286 and multiple output channels 1284 (e.g., output channel 1284-1, output channel 1284-2, output channel 1284-3, and output channel 1284-N). In certain example embodiments, the input channel 1286 of the main manifold 1280 is connected to an output channel of one or more missiles (e.g., missiles 150 of FIG. 1 above). Similarly, each output channel 1284 of the main manifold 1280 is connected to one or more wellbores (e.g., wellbore 192 of FIG. 1 above).

The main manifold 1280 can include multiple components. For example, in this case, the main manifold 1280 includes multiple valves 1282 (e.g., valve 1282-1, valve 1282-2, valve 1282-3, valve 1282-4) that are integrated in-line with piping 1288 that includes and is disposed between the input channel 1286 and the output channels 1284. A valve 1282 can have one or more of any of a number of configurations, including but not limited to a guillotine valve, a ball valve, a gate valve, a butterfly valve, a pinch valve, a needle valve, a plug valve, a diaphragm valve, and a globe valve.

As another example, the main manifold 1280 in this case includes multiple sensor devices 1260 (e.g., sensor device 1260-1, sensor device 1260-2, sensor device 1260-3, sensor device 1260-4, and sensor device 1260-N). The sensor devices 1260 are substantially similar to the sensor devices 160 discussed above with respect to FIG. 1. Each of the sensor devices 1260 can be configured to measure one or more parameters (e.g., flow rate, pressure, temperature) associated with fracturing fluid flowing through a portion of the main manifold 1280.

Each of the valves 1282 can have multiple positions, which can include a fully closed position, a fully open position, and any of a number of partially open positions. The position of a valve 1282 can be controlled manually or automatically. When the position of a valve 1282 is controlled automatically, a controller 1204 (substantially similar to the controller 160 of FIG. 1) can be used to provide such control using communication links 1205 and/or power transfer links 1287 (which are substantially similar to the communication links 105 and the power transfer links 187, respectively, discussed above with respect to FIG. 1).

At the time captured in FIG. 12, valve 1282-2 is in the fully closed position. As a result, fracturing fluid that enters the input channel 1286 is prevented from flowing past valve 1282-2 to outlet 1284-N, which connects to one or more corresponding wellbores. Subsequent to the time captured in FIG. 12, valve 1282-2 is opened (more specifically, moved to the fully open position), as captured in FIG. 13. The position of valve 1282-1, valve 1282-3, and valve 1282-4 in the time captured by FIG. 13 is unchanged from the position of those valves 1282 in the time captured by FIG. 12. As a result, at the time captured by FIG. 13, fracturing fluid that enters the input channel 1286 flows through valve 1282-1 to outlet 1284-1, through valve 1282-2 to outlet 1284-N, through valve 1282-3 to outlet 1284-2, and through valve 1282-3 to outlet 1284-4. In other words, at the time captured by FIG. 13, all of the wellbores that are fed by the outlets 1284 of the main manifold 1280 receive the fracturing fluid.

Figure 14:
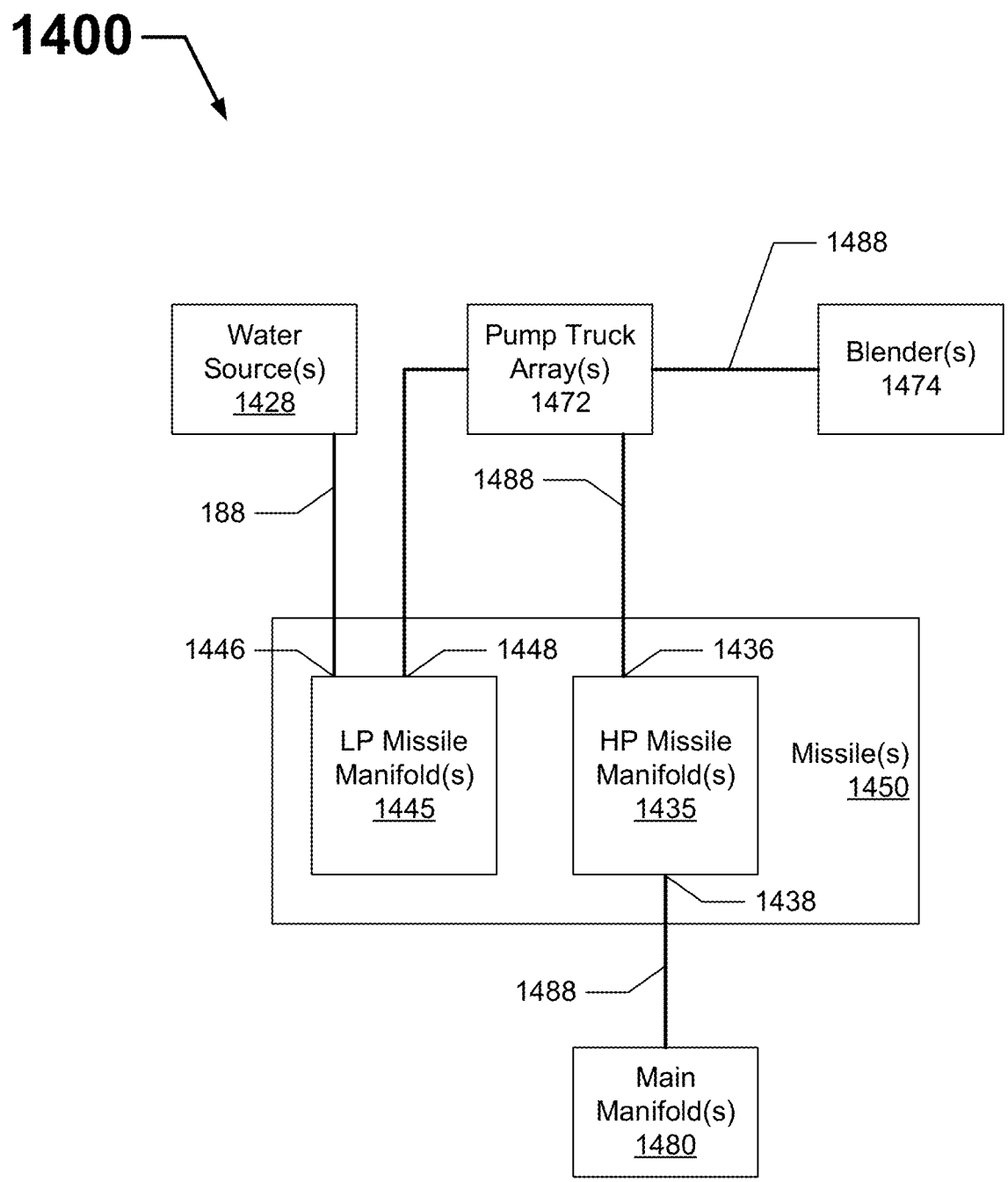
FIG. 14 shows another system for performing a simultaneous multi-well fracturing operation according to certain example embodiments.
Figure 16:
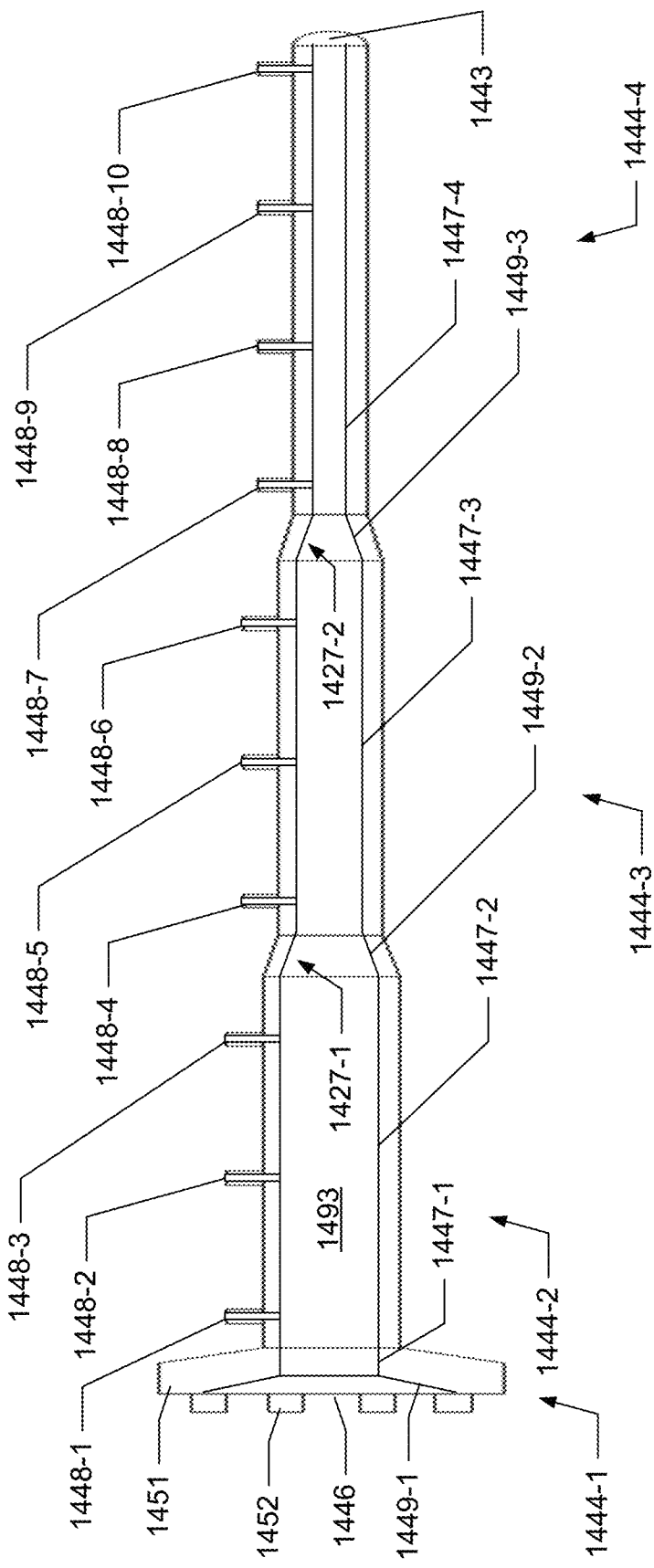
FIG. 16 shows an example of the high-pressure missile manifold of FIG. 14.

FIG. 14 shows another system 1400 for performing a simultaneous multi-well fracturing operation according to certain example embodiments. FIGS. 15A and 15B show an example of the high-pressure (HP) missile manifold 1435 of FIG. 14. FIG. 16 shows an example of the low-pressure (LP) missile manifold 1445 of FIG. 14. The one or more water sources 1428, the one or more pump truck arrays 1472 (including individual pump trucks), the one or more blenders 1474, the one or more missiles 1450, and the one or more main manifolds 1280 of the system 1400 of FIG. 14 can be substantially the same as the corresponding components discussed above. The system 1400 does not show the controllers (corresponding to the controllers 104 of FIG. 1), the sensor devices (corresponding to the sensor devices 160 of FIG. 1), the cranes (corresponding to the cranes 176 of FIG. 1), the wellbores (corresponding to the wellbores 190 of FIG. 1), and the wireline sources (corresponding to the wireline sources 170 of FIG. 1) to simplify FIG. 14, although one or more of these components can be included in the system 1400 of FIG. 14.

Referring to FIGS. 1 through 16, the missile 1450 of the system 1400 of FIG. 14 in this case includes two components. Specifically, the missile 1450 includes the LP missile manifold 1445 and the HP missile manifold 1435. From a process standpoint, water from the one or more water sources 1428 flows into (e.g., is induced, is forced into) the LP missile manifold 1445 of the missile 1450 through piping 1288. The water is received at an input channel 1446 (also called a LP input channel 1446) of the LP missile manifold 1445, flows through a main channel 1493 (also called a main LP channel 1493), and is then distributed through one of a number of output channels 1448. In this case, the LP missile manifold 1445 has ten output channels 1448 (output channel 1448-1, output channel 1448-2, output channel 1448-3, output channel 1448-4, output channel 1448-5, output channel 1448-6, output channel 1448-7, output channel 1448-8, output channel 1448-9, and output channel 1448-10).

Water that flows through an output channel 1448 (also called a LP output channel 1448) of the LP missile manifold 1445 enters a pump truck of a pump truck array 1472. At this point, the water is mixed with material from a blender 1474 in the pump truck, and the resulting fracturing fluid is pumped into the HP missile manifold 1435 at high pressure. The high-pressure fracturing fluid is received by one of a number of input channels 1436 (also called HP input channels 1436) of the HP missile manifold 1435. In this case, the HP missile manifold 1435 has 10 input channels 1436 (input channel 1436-1, input channel 1436-2, input channel 1436-3, input channel 1436-4, input channel 1436-5, input channel 1436-6, input channel 1436-7, input channel 1436-8, input channel 1436-9, and input channel 1436-10).

Each input channel 1436 can be configured with one or more coupling features to directly or indirectly couple to a pump truck of a pump truck array 1472. From an input channel 1436, the high-pressure fracturing fluid flows into a main channel 1491 (also called a main HP channel 1491) and eventually out of an output channel 1438 (also called the HP output channel 1438) of the HP missile manifold 1435 to a main manifold 1280 for distribution to the three or more wellbores during a stage of a fracturing operation.

The HP missile manifold 1435 of a missile 1450 in this case includes multiple pieces that are mechanically coupled to each other. Specifically, as shown in FIGS. 15A and 15B, the HP missile manifold 1435 includes an end cap 1433 that is mechanically coupled to a first body section 1434-1, which in turn is mechanically coupled to a second body section 1434-2, which in turn is mechanically coupled to a third body section 1434-3, which in turn is mechanically coupled to a fourth body section 1434-4, which in turn is mechanically coupled to a first extension section 1442-1, which in turn is mechanically coupled to a second extension section 1442-2, which in turn is mechanically coupled to a third extension section 1442-3. Each body section 1434 can have one or more characteristics (e.g., number of input channels 1436, diameter of the main HP channel 1491, existence of or number of widening sections 1439) that are the same as, or different than, the corresponding characteristics of another body section 1434 of the HP missile manifold 1435. In this way, the HP missile manifold 1435 of a missile 1450 can be customizable in terms of capacity and configuration.

In this case, each body section 1434 includes a main HP channel 1491 (defined by a wall 1437) that runs along its length and one or more input channels 1436 that merge into the main HP channel 1491. In this example, body section 1434-1 includes input channel 1436-1, input channel 1436-2, input channel 1436-3, and input channel 1436-4. Body section 1434-2 includes input channel 1436-5 and input channel 1436-6. Body section 1434-3 includes input channel 1436-7 and input channel 1436-8. Body section 1434-4 includes input channel 1436-9 and input channel 1436-10. An input channel 1436 can form an extension from the main part of the body section 1434. In addition, or in the alternative, an input channel 1436 can be a separate piece that is coupled, directly or indirectly, to the body section 1434. In this example, each input channel 1436 is a combination of a single-piece extension and a separate piece that is mechanically coupled to the single-piece extension.

Because of the high pressure and velocity that the fracturing fluid travels through the input channels 1436 from the pump truck arrays 1472, the input channels 1436 form an obtuse angle 1441 with the distal end of the main HP channel 1491. The obtuse angle 1441 formed between one input channel 1436 (e.g., input angle 1436-2) and the main HP channel 1491 can be the same as, or different than, the obtuse angle 1441 formed between another input channel 1436 (e.g., input channel 1436-7) and the main HP channel 1491.

In certain example embodiments, the diameter of the main HP channel 1491 within a body section 1434 can be uniform along the length of that body section 1434. An example of this is shown in FIG. 15B with respect to the body section 1434-1, the body section 1434-3, and the body section 1434-4. In alternative cases, as with the body section 1434-2, the diameter of the main HP channel 1491 varies along its length. In such a case, a widening section 1439 serves as a transition between the smaller diameter (e.g., 5⅛ inches) of the main HP channel 1491 (in this example, to the left of the widening section 1439) and the larger diameter (e.g., 7¹⁄₁₆ inches) of the main HP channel 1491 (in this example, to the right of the widening section 1439). In this example, fracturing fluid would flow from the smaller diameter (bounded by wall 1437-1) to the larger diameter (bounded by wall 1437-2) of the main HP channel 1491. While there is only one widening section 1439 in this case, a HP missile manifold 1435 can have multiple widening sections 1439 along the main HP channel 1491.

Otherwise, when two body sections 1434 are mechanically coupled to each other, the diameter of the main HP channel 1491 is substantially the same between the two body sections 1434 at that point. For example, the diameter of the main HP channel 1491 at the distal end of the body section 1434-1 is substantially the same as the diameter of the main HP channel 1491 at the proximate end of the body section 1434-2. As another example, the diameter of the main HP channel 1491 at the distal end of the body section 1434-3 is substantially the same as the diameter of the main HP channel 1491 at the proximate end of the body section 1434-4.

The widening section 1439 can serve multiple purposes. For example, the widening section 1439 can allow for a more compact design of the HP missile manifold 1435, saving space and material costs. As another example, the widening section 1439 can normalize the linear velocity of the fracturing fluid flowing through the main HP channel 1491 along the length of the HP missile manifold 1435. This latter benefit allows for a higher flow rate of the fracturing fluid through the HP missile manifold 1435 than what missiles that currently exist in the art allow. As a result, the example missile 1450 can safely and effectively provide enough fracturing fluid to three or more wellbores (e.g., wellbores 190) simultaneously during a stage of a fracturing operation.

Each end of a body section 1434 of the HP missile manifold 1435 is configured with one or more coupling features to directly or indirectly mechanically couple to an adjacent part of the HP missile manifold 1435 or another component of the system 1400. For example, the body section 1434-1 has at its proximal end a coupling feature 1431-2 in the form of a flange with apertures that traverse therethrough, where the coupling feature 1431-2 is configured to abut against a coupling feature 1431-1 in a similar configuration of a flange with apertures that traverse therethrough for the end cap 1433. When the apertures of the coupling feature 1431-1 and the coupling feature 1431-2 align with each other, independent coupling features 1432 (for example, in the form of fastening devices such as nuts and bolts) can be disposed within the apertures to couple the end cap 1433 and the body section 1434-1 to each other.

Similarly, the body section 1434-1 has at its distal end a coupling feature 1431-3 in the form of a flange with apertures that traverse therethrough, where the coupling feature 1431-3 is configured to abut against a coupling feature 1431-4 in a similar configuration of a flange with apertures that traverse therethrough at the proximal end of the body section 1434-2. When the apertures of the coupling feature 1431-3 and the coupling feature 1431-4 align with each other, independent coupling features 1432 (for example, in the form of fastening devices such as nuts and bolts) can be disposed within the apertures to couple the body section 1434-1 and the body section 1434-2 to each other.

Further, in this example, the body section 1434-2 has at its distal end a coupling feature 1431-5 in the form of a flange with apertures that traverse therethrough, where the coupling feature 1431-5 is configured to abut against a coupling feature 1431-6 in a similar configuration of a flange with apertures that traverse therethrough at the proximal end of the body section 1434-3. When the apertures of the coupling feature 1431-5 and the coupling feature 1431-6 align with each other, independent coupling features 1432 (for example, in the form of fastening devices such as nuts and bolts) can be disposed within the apertures to couple the body section 1434-2 and the body section 1434-3 to each other.

In addition, in this example, the body section 1434-3 has at its distal end a coupling feature 1431-7 in the form of a flange with apertures that traverse therethrough, where the coupling feature 1431-7 is configured to abut against a coupling feature 1431-8 in a similar configuration of a flange with apertures that traverse therethrough at the proximal end of the body section 1434-4. When the apertures of the coupling feature 1431-7 and the coupling feature 1431-8 align with each other, independent coupling features 1432 (for example, in the form of fastening devices such as nuts and bolts) can be disposed within the apertures to couple the body section 1434-3 and the body section 1434-4 to each other.

Further, in this example, the body section 1434-4 has at its distal end a coupling feature 1431-9 in the form of the end of a wall 1429 with apertures that traverse part of the way therein, where the coupling feature 1431-9 is configured to abut against a coupling feature 1431-10 in a configuration of a flange with apertures that traverse therethrough at the proximal end of the extension section 1442-1. When the apertures of the coupling feature 1431-9 and the coupling feature 1431-10 align with each other, independent coupling features 1432 (for example, in the form of fastening devices such as nuts) can be disposed within the apertures to couple the body section 1434-4 and the extension section 1442-1 to each other.

In addition, in this example, the extension section 1442-1 has at its distal end a coupling feature 1431-11 in the form of a flange with apertures that traverse therethrough, where the coupling feature 1431-11 is configured to abut against a coupling feature 1431-12 in a configuration of a flange with apertures that traverse therethrough at the proximal end of the extension section 1442-2. When the apertures of the coupling feature 1431-11 and the coupling feature 1431-12 align with each other, independent coupling features 1432 (for example, in the form of fastening devices such as nuts) can be disposed within the apertures to couple the extension section 1442-1 and the extension section 1442-2 to each other.

Further, in this example, the extension section 1442-2 has at its distal end a coupling feature 1431-13 in the form of a flange with apertures that traverse therethrough, where the coupling feature 1431-13 is configured to abut against a coupling feature 1431-14 in a configuration of a flange with apertures that traverse therethrough at the proximal end of the extension section 1442-3. When the apertures of the coupling feature 1431-13 and the coupling feature 1431-14 align with each other, independent coupling features 1432 (for example, in the form of fastening devices such as nuts) can be disposed within the apertures to couple the extension section 1442-2 and the extension section 1442-3 to each other.

The extension sections 1442 can be optional components of the HP missile manifold 1435. To the extent that the HP missile manifold 1435 includes one or more extension sections 1442, as in this case, each extension section 1442 can have any of a number of characteristics (e.g., diameter of main HP channel 1491, length, existence of or number of widening sections (e.g., widening section 1439)). Also, when a HP missile manifold 1435 has multiple extension sections 1442, the characteristics of one extension section 1442 can be the same as, or different than, the corresponding characteristics of one or more of the other extension sections 1442.

In alternative embodiments, two or more of the body sections 1434 shown in FIGS. 15A and 15B can form a single piece rather than multiple pieces that are mechanically coupled to each other. In this way, the higher flow rate benefits of the HP missile manifold 1435 can be realized while other benefits, such as modularity and customized configurability, can be sacrificed. Similarly, two or more of the extension sections 1442 shown in FIGS. 15A and 15B can form a single piece rather than multiple pieces that are mechanically coupled to each other.

The LP missile manifold 1445 of a missile 1450 can be formed from a single piece having multiple portions. In alternative embodiments, the LP missile manifold 1445 can include multiple pieces that are mechanically coupled to each other, such as what is shown in FIGS. 15A and 15B with respect to the HP missile manifold 1435. As shown in FIG. 16, the LP missile manifold 1445 in this case is a single piece that includes a first portion 1444-1, a second portion 1444-2, a first transition 1427-1, a third portion 1444-3, a second transition 1427-2, a fourth portion 1444-4, and an end cap 1443. Each portion 1444 of the LP missile manifold 1445 can have one or more characteristics (e.g., number of output channels 1448, diameter of the main LP channel 1493, existence of or number of narrowing sections 1449) that are the same as, or different than, the corresponding characteristics of another portion 1444 of the LP missile manifold 1445. In this way, the LP missile manifold 1445 of a missile 1450 can be adjustable in terms of capacity and configuration.

In this case, each portion 1444 includes a main LP channel 1493 (defined by a wall 1437) that runs along its length and one or more other channels that merge into the main HP channel 1493. In this example, portion 1444-1 includes an input channel 1446 at its proximal end that is linearly aligned with and merges into the main LP channel 1493. Portion 1444-1 also includes a narrowing section 1449-1 that ends at a wall 1447-1 forming the main LP channel 1493. Portion 1444-2 includes output channel 1448-1, output channel 1448-2, and output channel 1448-3. Portion 1444-3 includes output channel 1448-4, output channel 1448-5 and output channel 1448-6. Portion 1444-4 includes output channel 1448-7, output channel 1448-8, output channel 1448-9, and output channel 1448-10. The end cap 1443, disposed at the distal end of portion 1444-4, has no channels.

An output channel 1448 can form an extension from the body of the respective portion 1444. In addition, or in the alternative, an output channel 1448 can be a separate piece that is coupled, directly or indirectly, to the body of the portion 1444. In this example, each output channel 1448 is a single-piece extension from the body of the respective portion 1444. Because of the relatively low pressure and velocity that the water travels through the main LP channel 1493 to the output channels 1448 from the one or more water sources 1428, the output channels 1448 can form any angle with respect to the main LP channel 1493. In this case, each output channel 1448 is substantially perpendicular to the main LP channel 1493. The angle formed between one output channel 1448 (e.g., output angle 1448-2) and the main LP channel 1493 can be the same as, or different than, the angle formed between another output channel 1448 (e.g., output channel 1448-7) and the main LP channel 1493. Each output channel 1448 can be configured with one or more coupling features to directly or indirectly couple to a pump truck of a pump truck array 1472.

In certain example embodiments, as in this case, the diameter of the main LP channel 1493 within a portion 1444 is uniform along the length of that portion 1444. Specifically, diameter of the main LP channel 1493 within the portion 1444-2, the portion 1444-3, and the portion 1444-4 is substantially uniform along the length of those respective portions 1444. By contrast, each transition 1427 serves to reduce the main LP channel 1493 from one diameter to another diameter. As shown in FIG. 16, the transition 1427-1, using narrowing section 1449-2, reduces the larger diameter (defined by wall 1447-2) of the main LP channel 1493 within the portion 1444-2 to the relatively smaller diameter (defined by wall 1447-3) of the main LP channel 1493 within the portion 1444-3. Similarly, the transition 1427-2, using narrowing section 1449-3, reduces the larger diameter of the main LP channel 1493 within the portion 1444-3 to the relatively smaller diameter (defined by wall 1447-4) of the main LP channel 1493 within the portion 1444-4.

While there are three narrowing sections 1449 in this case, a LP missile manifold 1445 can have only one narrowing section, two narrowing sections, or more than three narrowing sections 1449 along the main LP channel 1493. The narrowing sections 1449 can serve multiple purposes. For example, a narrowing section 1449 can allow for a more compact design of the LP missile manifold 1445, saving space and material costs. As another example, a narrowing section 1449 can normalize the linear velocity of the water flowing through the main LP channel 1493 along the length of the LP missile manifold 1445. This latter benefit allows for a more even distribution of the water through the LP missile manifold 1445 to the multiple pump trucks of the one or more pump truck arrays 1472.

As appropriate, each piece of the LP missile manifold 1445 is configured with one or more coupling features to directly or indirectly mechanically couple to another component of the system 1400 (or, if the LP missile manifold 1445 has multiple pieces, to an adjacent piece of the LP missile manifold 1445). For example, the first portion 1444-1 has at its proximal end a coupling feature 1451 in the form of a flange with apertures that traverse therethrough, where the coupling feature 1451 is configured to abut against a complementary coupling feature of a water source 1428, where the complementary coupling feature can have a similar configuration of the coupling feature 1451 (e.g., a flange with apertures that traverse therethrough). When the apertures of the coupling feature 1451 and the complementary coupling feature of the water source 1428 align with each other, independent coupling features 1452 (for example, in the form of fastening devices such as nuts and bolts) can be disposed within the apertures to couple the first portion 1444-1 and the water source 1428 to each other.

Each of the LP missile manifold 1445 and the HP missile manifold 1435 of a missile 1450 can include one or more other features that allow three or more wellbores to undergo a fracturing operation simultaneously. For example, use of certain materials in the LP missile manifold 1445 and/or the HP missile manifold 1435, used separately from or in conjunction with one or more of the features (e.g., angle 1441 between an input channel 1436 and the main HP channel 1491, location and size of widening sections 1439) discussed above.

In certain example embodiments, an example missile 1450 is modular in one or more aspects. For example, as discussed above with respect to the HP missile manifold 1435, a component of the missile 1450 can be made of multiple pieces that are mechanically coupled to each other, where each piece can have one or more unique characteristics (e.g., length, number of output channels) relative to the other pieces. As another example, multiple components of a missile 1450 that serve the same purpose can be assembled in series or in parallel with each other. For example, an example missile 1450 can have two LP missile manifolds 1445 that receive water from two separate water sources 1428 and feed the water to different pump truck arrays 1472. Similarly, the example missile 1450 can have two HP missile manifolds 1435 that receive high-pressure fracturing fluid from two separate pump truck arrays 1472 and send the high-pressure fracturing fluid to the same main manifold 1480 or different main manifolds 1480.

Example embodiments can be used to improve the efficiency of fracturing operations for subterranean wellbores. Specifically, example embodiments can be used to effectively and simultaneously pump high-pressure fracturing fluid into three or more wellbores to execute fracturing operations. Example embodiments can be used in land-based or offshore field operations. Example embodiments also provide a number of other benefits. Such other benefits can include, but are not limited to, less use of resources, greater operational flexibility, time savings, and compliance with applicable industry standards and regulations. For instance, example embodiments can reduce the amount of time it takes to execute fracturing operation of a multi-well field having three or more wells.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for fracturing a plurality of wellbores on a multi-well pad, the system comprising:
    a missile that receives high-pressure fracturing fluid from a plurality of pump trucks, wherein the high-pressure fracturing fluid comprises substantially all components used for fracturing the plurality of wellbores; and
    a main manifold that receives the high-pressure fracturing fluid from the missile, wherein the main manifold comprises a plurality of valves and a plurality of output channels, wherein each of the plurality of valves are operated between an open position and a closed position,
    wherein the plurality of wellbores comprises a first wellbore, a second wellbore, and a third wellbore, wherein the plurality of wellbores is connected to the plurality of output channels of the main manifold, and wherein the plurality of valves of the main manifold are operated to enable simultaneous flow of the high-pressure fracturing fluid to the first wellbore, the second wellbore, and the third wellbore so that the first wellbore, the second wellbore, and the third wellbore are fractured simultaneously using the high-pressure fracturing fluid.

2. The system of claim 1, wherein the plurality of wellbores further comprises a fourth wellbore, wherein the plurality of valves of the main manifold are further operated to enable simultaneous flow of the high-pressure fracturing fluid to the first wellbore, the second wellbore, the third wellbore, and the fourth wellbore so that the first wellbore, the second wellbore, the third wellbore, and the fourth wellbore are fractured simultaneously using the high-pressure fracturing fluid.

3. The system of claim 2, wherein the fourth wellbore is added without interrupting fracturing of the first wellbore, the second wellbore, and the third wellbore.

4. The system of claim 1, further comprising:
    an additional missile that receives additional high-pressure fracturing fluid from an additional plurality of pump trucks,
    wherein the main manifold further receives the additional high-pressure fracturing fluid from the additional missile.

5. The system of claim 4, wherein the main manifold distributes the high-pressure fracturing fluid to a first subset of the plurality of wellbores, and wherein the main manifold distributes the additional high-pressure fracturing fluid to a second subset of the plurality of wellbores.

6. The system of claim 5, wherein the first subset of the plurality of wellbores comprises the first wellbore and the second wellbore, and wherein the second subset of the plurality of wellbores comprises the third wellbore.

7. The system of claim 1, further comprising:
    an additional missile that receives additional high-pressure fracturing fluid from an additional plurality of pump trucks; and
    an additional main manifold that receives the additional high-pressure fracturing fluid from the additional missile, wherein the additional main manifold comprises a plurality of additional valves and a plurality of additional output channels, wherein each of the plurality of additional valves are operated between the open position and the closed position.

8. The system of claim 7, wherein the additional main manifold distributes the additional high-pressure fracturing fluid to a fourth wellbore, a fifth wellbore, and a sixth wellbore of the plurality of wellbores.

9. The system of claim 1, wherein the missile delivers the high-pressure fracturing fluid to the main manifold at a rate of at least 180 barrels per minute.

10. The system of claim 1, further comprising:
a blender that mixes sand and chemical additives.

11. The system of claim 1, wherein the missile comprises an inner channel having a widening section along its length.

12. The system of claim 11, wherein the widening section increases a diameter of the inner channel through which a subset of the high-pressure fracturing fluid flows from a subset of the plurality of pump trucks to the main manifold.

13. The system of claim 12, wherein a remainder of the high-pressure fracturing fluid from a remainder of the plurality of pump trucks flows into the inner channel of the missile before the widening section.

14. A system for fracturing a plurality of wellbores on a multi-well pad, the system comprising:
a missile that receives high-pressure fracturing fluid from a plurality of pump trucks, wherein the missile comprises a high-pressure (HP) missile manifold having a plurality of HP input channels, a HP output channel, and a main HP channel disposed between the plurality of HP input channels and the HP output channel, wherein each of the plurality of HP input channels is configured to couple to and receive the high-pressure fracturing fluid from one of the plurality of pump trucks, and wherein the main HP channel has a widening section along its length that separates a first HP portion of the main HP channel having a first HP diameter and a second HP portion of the main HP channel having a second HP diameter; and
a main manifold that receives the high-pressure fracturing fluid from the HP output channel of the missile, wherein the main manifold comprises a plurality of valves and a plurality of manifold output channels, wherein each of the plurality of valves are operated between an open position and a closed position, wherein the HP output channel is configured to couple to and send the high-pressure fracturing fluid to the main manifold,
wherein the plurality of wellbores comprising a first wellbore, a second wellbore, and a third wellbore, wherein the plurality of wellbores is connected to the plurality of manifold output channels of the main manifold, and wherein the plurality of valves of the main manifold are operated to enable simultaneous flow of the high-pressure fracturing fluid to the first wellbore, the second wellbore, and the third wellbore so that the first wellbore, the second wellbore, and the third wellbore are fractured simultaneously using the high-pressure fracturing fluid.

15. The system of claim 14, wherein the first HP portion of the main HP channel of the missile is located between the widening section and the HP output channel, and wherein the first HP diameter exceeds the second HP diameter.

16. The system of claim 15, wherein the widening section of the main HP channel of the missile is disposed between two adjacent HP input channels among the plurality of HP input channels.

17. The system of claim 16, wherein each of the plurality of HP input channels of the missile forms an obtuse angle with the main HP channel toward the HP output channel.

18. A system for fracturing a plurality of wellbores on a multi-well pad, the system comprising:
a missile that receives water from a water source, wherein the missile comprises a low-pressure (LP) missile manifold having a plurality of LP output channels, a LP input channel, and a main LP channel disposed between the plurality of LP output channels and the LP output channel, wherein the LP input channel is configured to couple to and receive the water from the water source, wherein each of the plurality of LP output channels is configured to couple to and send the water to the plurality of pump trucks, and wherein the main LP channel has a narrowing section along its length that separates a first LP portion of the main LP channel having a first LP diameter and a second LP portion of the main LP channel having a second LP diameter, wherein the missile further is configured to receive a high-pressure fracturing fluid from the plurality of pump trucks, wherein the high-pressure fracturing fluid comprises the water; and
a main manifold that receives the high-pressure fracturing fluid from the missile, wherein the main manifold comprises a plurality of valves and a plurality of manifold output channels, wherein each of the plurality of valves are operated between an open position and a closed position,
wherein the plurality of wellbores comprising a first wellbore, a second wellbore, and a third wellbore, wherein the plurality of wellbores is connected to the plurality of manifold output channels of the main manifold, and wherein the plurality of valves of the main manifold are operated to enable simultaneous flow of the high-pressure fracturing fluid to the first wellbore, the second wellbore, and the third wellbore so that the first wellbore, the second wellbore, and the third wellbore are fractured simultaneously using the high-pressure fracturing fluid.

19. The system of claim 18, wherein the first LP portion of the main LP channel of the missile is located between the narrowing section and the LP input channel, and wherein the first LP diameter exceeds the second LP diameter.

20. The system of claim 19, wherein the narrowing section of the main LP channel of the missile is disposed between two adjacent LP output channels among the plurality of LP output channels.

* * * * *